(12) United States Patent
Hunter, Jr. et al.

(10) Patent No.: US 9,203,628 B2
(45) Date of Patent: Dec. 1, 2015

(54) METHOD AND APPARATUS FOR DISTRIBUTING POWER OVER COMMUNICATION CABLING

(71) Applicant: Andrew LLC, Hickory, NC (US)

(72) Inventors: Roger Allan Hunter, Jr., Lynchburg, VA (US); Thomas Kummetz, Kissing (DE); Christopher Goodman Ranson, Concord, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/593,832

(22) Filed: Jan. 9, 2015

(65) Prior Publication Data

US 2015/0126251 A1    May 7, 2015

Related U.S. Application Data

(62) Division of application No. 12/879,577, filed on Sep. 10, 2010, now Pat. No. 8,935,543.

(60) Provisional application No. 61/320,364, filed on Apr. 2, 2010.

(51) Int. Cl.
| | |
|---|---|
| *H04L 12/10* | (2006.01) |
| *H04L 12/40* | (2006.01) |
| *H04W 88/08* | (2009.01) |

(52) U.S. Cl.
CPC .......... *H04L 12/10* (2013.01); *H04L 12/40045* (2013.01); *H04W 88/085* (2013.01); *Y10T 307/305* (2015.04); *Y10T 307/469* (2015.04); *Y10T 307/696* (2015.04)

(58) Field of Classification Search
CPC .......................... H04L 12/10; H04L 12/40045
See application file for complete search history.

(56) References Cited

U.S. PATENT DOCUMENTS

| | | |
|---|---|---|
| 6,295,356 B1 | 9/2001 | De Nicolo |
| 6,448,672 B1 | 9/2002 | Voegeli et al. |

(Continued)

FOREIGN PATENT DOCUMENTS

| | | |
|---|---|---|
| WO | 2007106795 | 9/2007 |
| WO | 2011123314 A1 | 10/2011 |

OTHER PUBLICATIONS

Six-page Cisco Systems, Inc., Cisco Unified Phones: Conserve Energy with Intelligent Power Allocation, 2008 Cisco Public Information Document.

(Continued)

*Primary Examiner* — Stefan Stoynov
(74) *Attorney, Agent, or Firm* — Wood, Herron & Evans, LLP

(57) ABSTRACT

A PoE powered device and method of operation are provided. The device includes a first port unit configured to negotiate receipt of a level of PoE power from a power sourcing equipment. The power is received on a first pair of taps on a first communication port. A detection unit is configured to detect a presence of a first optional circuit load and to detect a presence of a second optional power load. A control circuit is configured to establish connectivity between a second pair of taps on the first communication port and a second powered device port unit in response to the detection unit detecting the first optional load, and further configured to establish connectivity between the second pair of taps and a third pair of taps on a pass-through communication port in response to the detection unit failing to detect the first load and detecting the second load.

26 Claims, 18 Drawing Sheets

(56) References Cited

U.S. PATENT DOCUMENTS

| | | | |
|---|---|---|---|
| 6,535,983 B1 | 3/2003 | McCormack et al. | |
| 6,643,566 B1 | 11/2003 | Lehr et al. | |
| 6,713,939 B2 | 3/2004 | Kasahara | |
| 7,240,224 B1 | 7/2007 | Biederman | |
| 7,449,796 B2 | 11/2008 | Elkayam et al. | |
| 7,460,889 B2 | 12/2008 | Darshan et al. | |
| 7,471,014 B2 * | 12/2008 | Lum et al. | 307/83 |
| 7,492,059 B2 | 2/2009 | Peker et al. | |
| 7,509,114 B2 | 3/2009 | Berson et al. | |
| 7,549,067 B2 | 6/2009 | Tolliver | |
| 7,589,435 B2 | 9/2009 | Metsker et al. | |
| 7,593,756 B2 | 9/2009 | Ferentz et al. | |
| 7,603,570 B2 | 10/2009 | Schindler et al. | |
| 7,612,470 B2 | 11/2009 | Pincu et al. | |
| 7,613,939 B2 | 11/2009 | Karam et al. | |
| 7,639,469 B2 | 12/2009 | Heath et al. | |
| 7,664,136 B2 * | 2/2010 | Toebes et al. | 370/463 |
| 7,890,776 B2 | 2/2011 | Diab et al. | |
| 7,903,809 B2 | 3/2011 | Karam | |
| 7,966,502 B2 | 6/2011 | Diab et al. | |
| 7,974,305 B2 * | 7/2011 | Diab | 370/463 |
| 8,082,453 B2 * | 12/2011 | Diab | 713/300 |
| 8,106,530 B2 | 1/2012 | Schindler et al. | |
| 8,301,913 B2 | 10/2012 | Diab et al. | |
| 8,935,543 B2 | 1/2015 | Hunter, Jr. et al. | |
| 2007/0284946 A1 * | 12/2007 | Robbins | 307/18 |

OTHER PUBLICATIONS

Two-page Akros Silcon, Folsom, California USA, High Power PD Controller from Akros Silicon, Mar. 2008.

Five-page Along Ferentz and Noam Tziony, Method for Distributed Power Management, Jan. 1, 2009.

Eleven-page International Search Report for PCT/US2011/029710 mailed May 24, 2011.

* cited by examiner

METHOD AND APPARATUS FOR DISTRIBUTING POWER OVER COMMUNICATION CABLING

CROSS-REFERENCE TO RELATED APPLICATIONS

This Application is a Divisional Application of U.S. Non-Provisional patent application Ser. No. 12/879,577, filed Sep. 10, 2010, entitled "METHOD AND APPARATUS FOR DISTRIBUTING POWER OVER COMMUNICATION CABLING", which claims priority from U.S. Provisional Patent Application Ser. No. 61/320,364 filed Apr. 2, 2010, entitled "METHOD AND APPARATUS FOR DISTRIBUTING POWER OVER COMMUNICATION CABLING". The applications are both hereby incorporated by reference in their entireties as though fully disclosed herein.

FIELD OF THE INVENTION

The present invention relates generally to telecommunications and more particularly to a method and system for improved power delivery over Ethernet cables.

BACKGROUND OF THE INVENTION

Numerous powered devices utilize power over multi-pair Ethernet cables. The IEEE 802.3af-2003 Power over Ethernet (PoE) standard, ratified in June, 2003, defines a standardized approach by which power sourcing equipment (PSE) is able to provide a powered device (PD) with up to 15.4 watts of DC power over, for example, a category 5 (CAT 5) twisted pair communication cable. The IEEE 802.3at-2009 PoE standard, later ratified Sep. 11, 2009, defines a standardized PoE approach by which a powering sourcing device (PSE) is able to provide a powered device (PD) with up to up to 25.5 watts of DC power over, for example, a category 5 twisted pair communication cable.

A category 5 cable includes 8 wire connectors grouped into 4 wire-pairs. The PoE standards based approaches provide DC power over 2 out of the 4 wire-pairs included in the cable and such pairs are generally referred to as a PoE powered pair. A "pair of PoE taps" refers to the center taps of Ethernet magnetics used to couple and decouple power to and from the PoE powered pairs of a CATx cable. Therefore, a pair of PoE taps refers to a set of two taps with one tap being used for current delivery and a second tap being used for current return. Contemporary telecommunications systems can then utilize the remaining pairs in the cable as data lines, although, in some contemporary systems, power and data may be implemented on the same twisted pair. However, as telecommunications devices adapt to meet new communication demands, such devices may have different power needs or demands. For example, as more functionality is added to communication devices and systems, such devices and systems may include powered peripheral devices that couple with or are plugged into the main communication devices. Such peripheral devices will need additional power. Accordingly there is a need in the art for an improved method and system of delivering power to communication devices. There is also a need to have flexibility in such power delivery to respond to situations where additional power may be selectively needed or not needed.

SUMMARY OF THE INVENTION

A powered device (PD) detects the presence of optional power loads within the PD and distributes PoE power based on a set of determined priorities and the detected loads.

The described powered device approach may be used in any number of end user and network infrastructure devices, including but not limited to, remote antenna units in a distributed antenna system (DAS). For example, in one example embodiment, an embodiment of the described powered device (PD) is implemented as a remote antenna unit (RAU) in a DAS system that receives PoE power and data from a DAS master unit over one or more twisted pair communication cables, e.g., Category 5 (CAT5) or Category 6 (CAT6) cables.

In a first example embodiment, a PoE powered device is described that includes, a first PD port unit configured to negotiate receipt of a level of PoE power from a power sourcing equipment (PSE), the PoE power received on a first pair of PoE taps on a first PD communication port, a detection unit configured to detect a presence of a first optional circuit load and to detect a presence of a second optional power load, and a control circuit configured to establish connectivity between a second pair of PoE taps on the first PD communication port and a second PD port unit in response to the detection unit detecting the first optional load, and configured to establish connectivity between the second pair of PoE taps and a third pair of PoE taps on a pass-through communication port in response to the detection unit failing to detect the first optional load and detecting the second optional power load.

In a second example embodiment, a PoE powered device is described that includes, a combined PD port unit for combining PoE power received on multiple pairs of PoE taps on a first PD communication port, a PoE tap circuit, which refers to a pair of taps from the Ethernet magnetics (and any other required circuitry) to decouple power from the PoE powered pairs, that connects a first pair of PoE taps on the first PD communication port to the combined PD port unit, a detection unit configured to detect a presence of a first optional circuit load and to detect a presence of a second optional power load, and a control circuit configured to establish connectivity between a second pair of PoE taps on the first PD communication port and the combined PD port unit in response to the detection unit detecting the first optional load, and configured to establish connectivity between the second pair of PoE taps and a third pair of PoE taps on a pass-through communication port in response to the detection unit failing to detect the first optional load and detecting the second optional power load.

In a third example embodiment, a PoE powered device is described that includes, a PD port unit configured to negotiate a receipt of PoE power from a power sourcing equipment (PSE), the PoE power received on a first pair of PoE taps on a first PD communication port, a detection unit configured to detect a presence of an optional circuit load, and a control circuit configured to establish connectivity between a second pair of PoE taps on the first PD communication port and a third pair of PoE taps on a pass-through communication port on the detection unit detecting the optional power load.

In a fourth example embodiment, a method of distributing PoE power in a distributed antenna system remote antenna unit is described that includes, negotiating receipt of a first PoE power from a power sourcing equipment (PSE), the first PoE power received on a first pair of PoE taps on a first PD communication port, performing a detection process to detect a presence of a first optional circuit load, performing a detection process to detect a presence of a second optional power load, negotiating receipt of a second PoE power from the power sourcing equipment (PSE), the second PoE power received on a second pair of PoE taps on the first PD communication port in response to detecting the first optional load, and establishing connectivity between the second pair of PoE taps and a third pair of PoE taps on a pass-through communication port in response to failing to detect the first optional load and detecting the second optional power load.

In a fifth example embodiment, a method of distributing PoE power in a powered device is described that includes, establishing connectivity between a first pair of PoE taps on a first PD communication port and a PoE power combining circuit, performing a detection process to detect a presence of a first optional circuit load, performing a detection process to detect a presence of a second optional power load, establishing connectivity between a second pair of PoE taps on the first PD communication port and the PoE power combining circuit in response to detecting the first optional load, and establishing connectivity between the second pair of PoE taps and a third pair of PoE taps on a pass-through communication port in response to failing to detect the first optional load and detecting the second optional power load.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

Example embodiments of a powered device (PD) that detects the presence of optional power loads within the PD, and that distributes PoE power based on a set of determined priorities and the detected loads, will be described with reference to the following drawings, wherein like numerals designate like elements.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF EMBODIMENTS OF THE INVENTION

Figure 1:
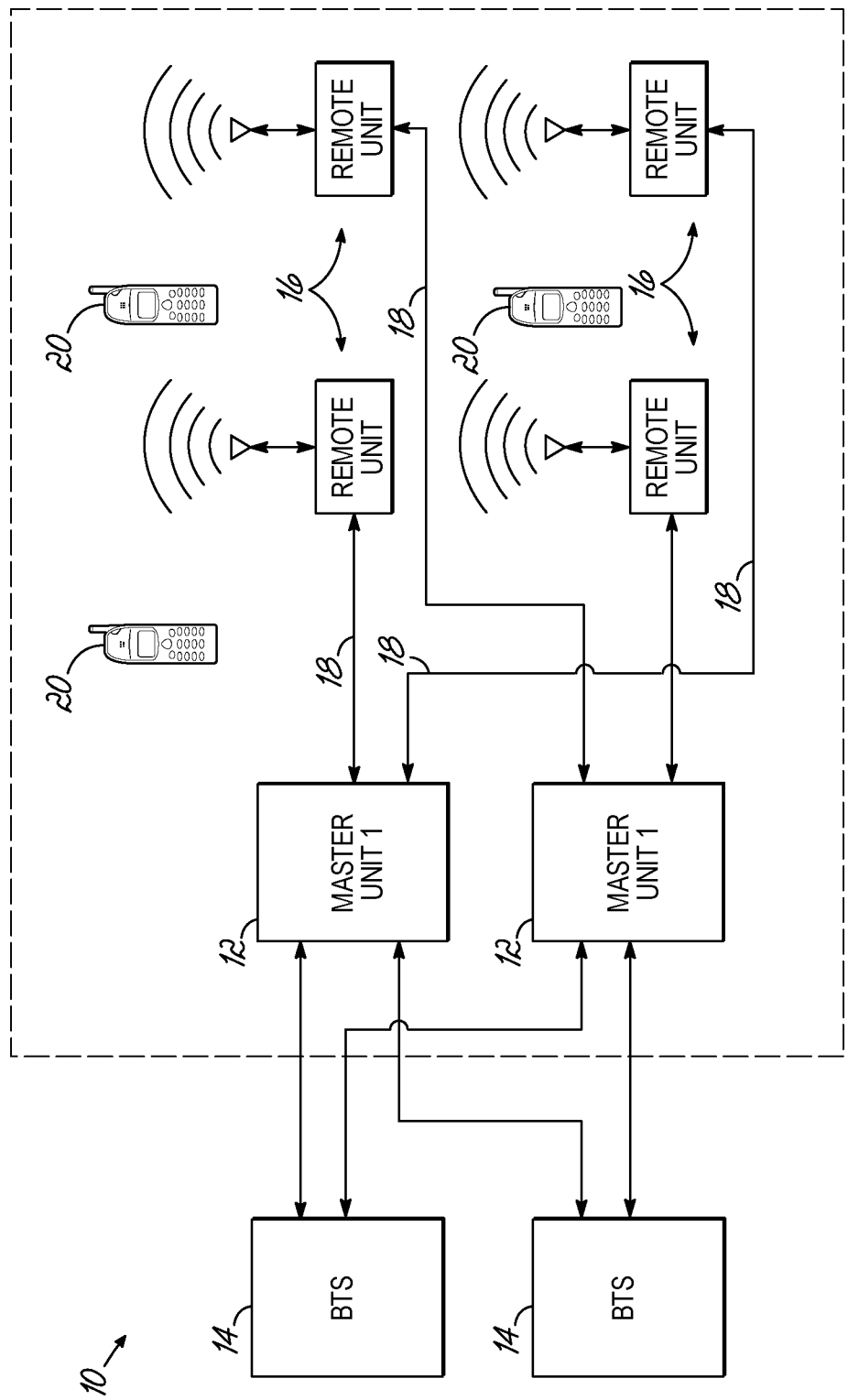
FIG. 1 is a schematic diagram of an exemplary distributed antenna system.

A distributed antenna system (DAS), such as the exemplary DAS 10 illustrated in FIG. 1, may include one or more master units (MU) 12 that are in communication with various base transceiver stations (BTSs) 14 of various cellular providers employing different air interfaces and a series of physically separated remote antenna units (RAUs) that are each connected to the MU via a serial link 18. The MU 12 down converts and digitizes, e.g., performs analog-to-digital conversion (ADC) of signals from the base station(s) 14 and time division multiplexes (TDM) the digital data into frames that are transmitted over serial links 18 to the RAUs 16. The RAUs 16 digital to analog converters (DAC) convert the data to analog and up convert the analog signals to the required RF for transmission to fixed or mobile subscribers 20 in the system. In a similar manner, the RAUs 16 down-convert and digitize signals from the fixed/mobile users 20 and transmit the digitized data back to the MU 12. The MU DAC converts the signals from the mobile/fixed subscribers 20 and up-converts them to the appropriate signals for transmission to the various BTSs 14.

In such a DAS operational environment, embodiments of the described powered device can be implemented as an RAU 16. As described below, embodiments of the described powered device support one or more optional loads within the powered device itself, and one or more optional loads supported by one or more pass-through communication ports. A pass-through communication port is a port that passes through communication data and DC or AC power. The data rate on the pass-through port may be the full data rate of the first communication port (or ports if there is more from the expansion element) or a fraction of the data rate. The DC or AC power of the pass-through communication port may be a either the full power received on one PoE taps pair or a fraction of the total received power. The pass-through port provides PoE standard compliant power. While PoE generally refers to a specific standard, use of PoE in this specification refers to both the standard and any other method that delivers power via Ethernet cables or twisted pair cables.

Examples of optional loads within the RAU 16 powered device itself are, for example, add-on communication boards, e.g., digital signal processing boards, that extend the frequency range available to the RAU 16 for communicating with fixed/mobile users. The inclusion of one or more such optional digital signal processing boards increases the number of RF based services the RAU 16 can support for fixed/mobile users in a service area of the RAU 16. For example, increased frequency range at the RAU 16 would allow the RAU 16 to support cellular based traffic for additional cellular operators, or allow the RAU to support non-cellular RF communications, such as public safety related RF channels.

In a RAU 16 embodiment of the described powered device, optional PoE loads connected to the powered device via the one or more pass through communication ports may include, for example, WiFi based RF repeaters, WiMax based RF repeaters, and/or other non-cellular network infrastructure components that allow the DAS/RAU infrastructure to support lower rate Ethernet data or other data from WiFi/WiMax access points or other standard access points or even maintenance terminals, or IP cameras, etc. Data sent to or received from such optional load devices can be combined by the RAU 16 with other traffic exchanged by the RAU 16 with the DAS 10 MU 12. Once such lower rate Ethernet data or other data is received at the MU 12 or an intermediate distribution or expansion element (not shown), the data may be separated from the cellular communication traffic and be redirected by the MU 12 or the intermediate distribution or expansion element to compatible infrastructure components, e.g., LAN/WAN infrastructure components such as switches or routers, for further transmissions via networks compatible with the respective components.

Figure 2:
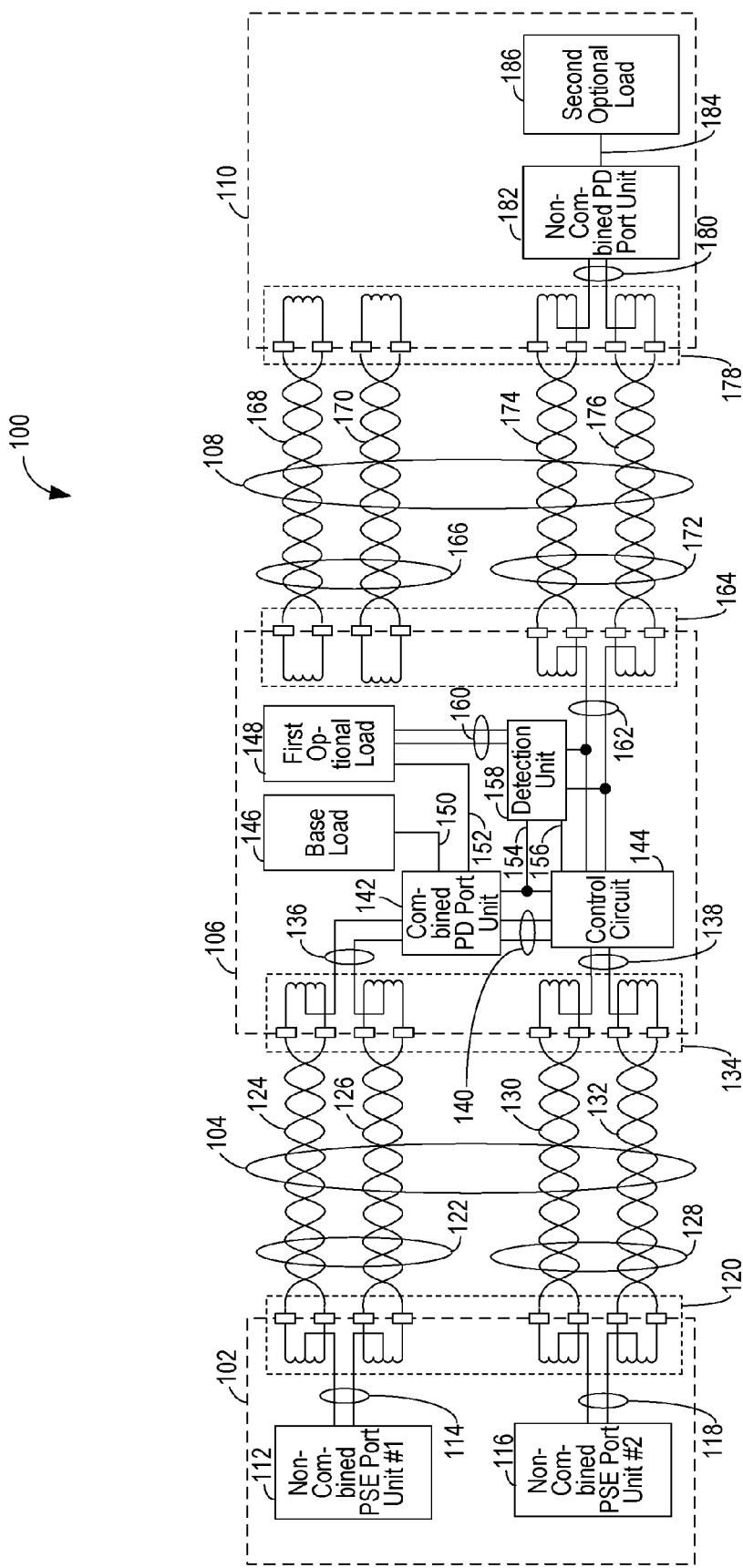
FIG. 2 is a schematic diagram of a first example PoE service chain that includes an embodiment of the described powered device which may be implemented in the exemplary distributed antenna system of FIG. 1.

FIG. 2 is a schematic diagram of a PoE service chain 100 for use in a communication system or device in which a first powered device (PD) 106 embodiment receives PoE power from power sourcing equipment (PSE) 102 via conductors or wire pairs within a communication cable 104, such as an Ethernet cable or twisted pair cable. The PD 106 selectively delivers the received PoE power to power loads within the PD 106, or to a second powered device 110 via a pass through communication port or to both, based on a set of determined priorities and/or detected loads according to the invention. The powered devices 106, 110 may contain a PD port unit which contains electronic circuitry including a PD controller/interface as well as Ethernet magnetics which are configured to extract power from CATx cables, for example.

As shown in FIG. 2, power sourcing equipment 102 includes a first non-combined PSE port unit 112, a second non-combined PSE port unit 116, and a PoE enabled communication port 120 that is operably coupled to the units 112, 116. The PSE port units contain electronic circuitry including a PSE controller/interface and Ethernet magnetics configured to allow the application and control of power on cables, such as CATx cables. While FIG. 2 shows units 112, 116 co-located in element 102, they might be in separate locations or components. First non-combined PSE port unit 112 connects via tap connection 114 to a first powered cable pair 122 of a communication cable 104 connected to PoE enabled communication port 120. Second non-combined PSE port unit 116 connects via tap connection 118 to a second powered cable pair 128 of communication cable 104. The set or cable pair 122 includes wire pair 124 and wire pair 126. Similarly, cable pair 128 includes wire pairs 130 and 132.

First powered device 106 includes a PoE enabled communication port 134, a combined PD port unit 142, a control circuit 144, a base load 146, a first optional load 148, a detection unit 158, and a pass through communication port 164 of powered device 106. Combined PD port unit 142 connects via tap connection 136 to powered cable pair 122 of communication cable 104 connected to PoE enabled port 134 of powered device 106. Unit 142 also connects to base load 146 via power lead 150, and connects to first optional load 148 via power lead 152 to supply power to those loads 146, 148. The unit 142 connects to detection unit 158 and to control circuit 144 via power lead 154, and further connects to control circuit 144 via PoE transfer leads 140. Control circuit 144 connects via tap connection 138 to powered cable pair 128 of communication cable 104 to receive power from cable pair 128. Depending on the operation of the invention, control circuit 144 optionally connects or couples 138 to either combined PD port unit 142 via the PoE transfer leads 140 or to another powered cable pair 172 of a communication cable 108 that is connected to the pass through communication port 164 via tap connection 162. In that way, the control circuit 144 can deliver power to an optional load 148 or pass power through to optional load 186. Detection unit 158 monitors the presence of first optional load 148 via monitoring leads 160, monitors the presence of second optional load 186 via tap connection 162, and provides detection information based on such monitoring to the control circuit 144 via control lead 156.

Second powered device 110, which may be a peripheral or plug-in device, includes a PoE enabled port 178, a non-combined PD port unit 182 and a second optional load 186. The device 110 and second optional load 186 illustrated in FIG. 2 and the other various devices and optional loads as discussed herein might be, for example, a WiFi access point, a WiMax access point, a maintenance terminal, IP camera, and/or combinations thereof. Non-combined PD port unit 182 connects via tap connection 180 to the powered cable pair 172 of a communication cable 108 that is connected to the PoE enabled port 178. Non-combined PSE port unit 182 delivers PoE power to second optional load 186 via suitable internal leads 184.

With respect to the power sourcing equipment 102, non-combined PSE port unit 112 and non-combined PSE port unit 116 are configured so that each provides PoE power over a different set of PoE powered conductor pairs. In one example embodiment, non-combined PSE port unit 112 is configured to supply power over conductor pair 1 and 2 and conductor pair 3 and 6, while non-combined PSE port unit 112 is configured to supply power over conductor pair 4 and 5 and conductor pair 7 and 8. In such a manner, all 8 conductors in an Ethernet category 5 cable are used to supply PoE power to powered device 106.

With respect to powered device 106, combined PD port unit 142 is configured to support PoE negotiation with non-combined PSE port unit 112 over powered cable pair 122 which includes a first wire-pair 124 and a second wire-pair 126. In one embodiment, combined PD port unit 142 provides non-combined PSE Port unit 112 with an initial PD sense feedback based on a predetermined resistance placed across tap connection 136. Upon sensing the predetermined resistance, non-combined PSE Port unit 112 provides combined PD port unit 142 with a predetermined initial power level that is used by combined PD port unit 142 to power-up enough circuitry to conduct subsequent PoE power negotiations with non-combined PSE Port unit 112. Upon receipt of the higher, negotiated power level, combined power unit 142 delivers power to and initiates a startup of base load 146 circuitry, detection unit 158 and control circuit 144.

Upon startup, detection unit 158 tests monitoring leads 160 and tap connection 162 to determine whether first optional load 148 and second optional load 186, respectively, are present. For example, detection unit 158 may test for the presence of a predetermined resistance on each of the respective leads, and if the predetermined resistance is measured or located, detection unit 158 is operable to report to control circuit 144 that the respective detected load is present. Upon startup, control circuit 144 awaits detection information from detection unit 158. If the first optional load 148 is detected, control circuit 144 connects taps 138 from second powered cable pair 128 of cable 104 to combined PD port unit 142 via PoE transfer leads 140. If first optional load 148 is not detected, but second optional load 186 is detected, control circuit 144 connects taps 138 from second powered cable pair 128 of cable 104 to power taps 162 on or associated with powered pair 172, including a first wire-pair 174 and a second wire-pair 176, within cable 108. Cable pair 166 including first wire-pair 168 and second wire-pair 170 are not used in this embodiment illustrated in FIG. 2.

Connecting taps 138 from second powered cable pair 128, including a first wire-pair 130 and a second wire-pair 132, of cable 104 to the combined PD port unit 142 allows combined PD port unit 142 to perform PD/PSE PoE power negotiation with the non-combined PSE port unit 116. Once a negotiated power level is received, combined PD port unit 142 provides power to first optional load 148 via power lead 152. To power second optional load 186, connecting taps 138 from second powered cable pair 128 of cable 104 to power taps 162 on or associated with powered cable pair 172 within cable 108 allows non-combined PD port unit 182 to perform PD/PSE PoE power negotiation with non-combined PSE port unit 116. Once a negotiated power level is received, non-combined PD port unit 182 provides power to second optional load 148 via leads 184.

Figure 3:
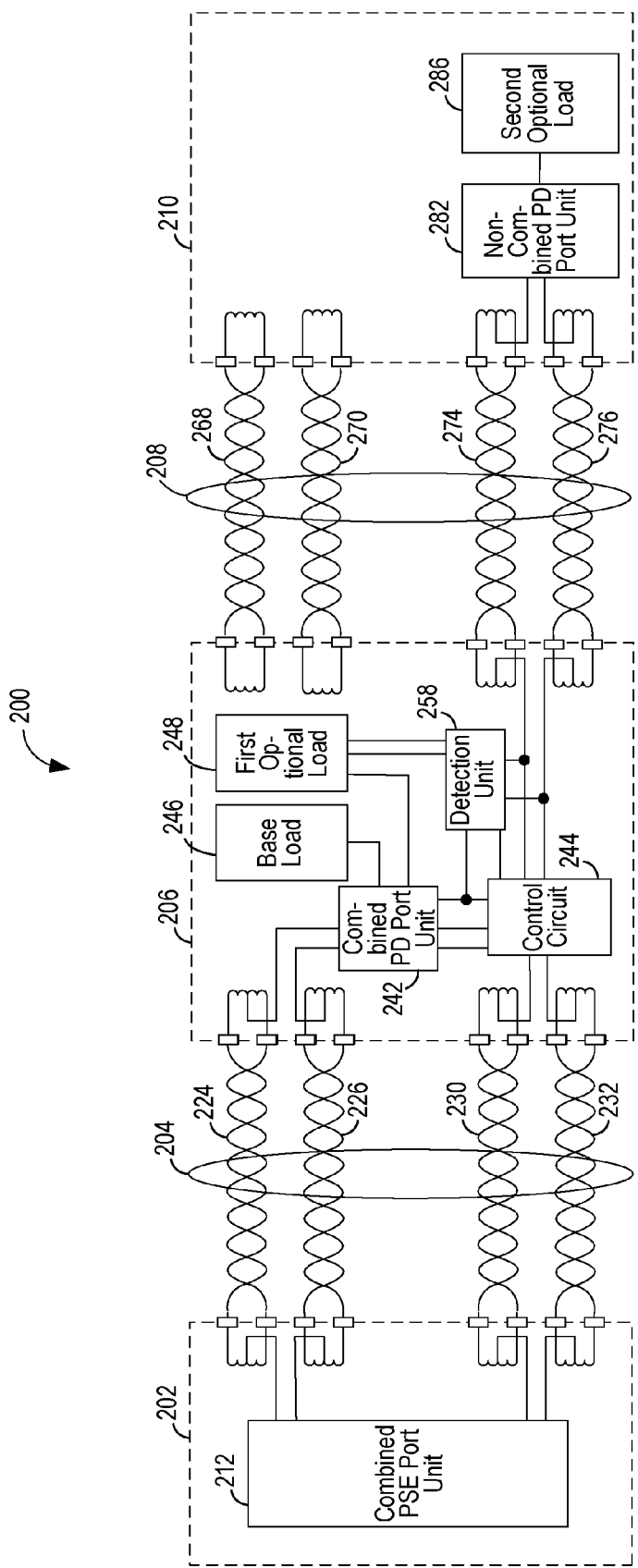
FIG. 3 is a schematic diagram of a second example PoE service chain that includes the powered device of FIG. 2.

FIG. 3 is a schematic diagram of an embodiment of the invention with a PoE service chain 200 that is somewhat similar to PoE service chain 100, described above with respect to FIG. 2. Components in PoE service chain 200 which are identical to corresponding components in PoE service chain 100 have been provided with numeric labels that generally match the numeric label of the corresponding feature described above with respect to FIG. 2. Only the first digit of each numeric label has been changed to correspond to the new figure number. For example, first powered device 206 is identical in configuration and function to first powered device 106 described above with respect to FIG. 2. Components that remain the same in FIG. 3 as the corresponding component described above with respect to FIG. 2 are not again described in FIG. 3.

Power sourcing equipment (PSE) 202 differs from power sourcing equipment (PSE) 102, described above with respect to FIG. 2 in that power sourcing equipment (PSE) 202 includes a single combined PSE port unit 212 in place of the non-combined PSE port unit 112 and the non-combined PSE port unit 116 described above with respect to FIG. 2. For example, non-combined PSE port unit 112 and the non-combined PSE port unit 116, described above with respect to FIG. 2, may be implemented with 802.3af or 802.3at compliant PSE components, though embodiments are not limited components compliant with the standards. For example, a first non-combined PSE port unit could be configured so that PoE power is applied to a first set of selected wire-pairs, e.g., a standards compliant set of wire-pairs; a second non-combined PSE port unit could be configured so that PoE power is applied to a second set of selected wire-pairs, e.g., the remaining non standards compliant set of wire-pairs.

However, in FIG. 3, the combined PSE port unit 212 is a non standards compliant PoE component that is configured to apply PoE to all conductors within the communication cable 204. The combined PSE port unit 212 may consist, in some embodiments, of separate PSE units that operate independently, but for convenience are packaged together in the same package. Embodiments of combined PSE port unit 212 are implemented to perform in a manner that is functionally the same as non-combined PSE port unit 112 and non-combined PSE port unit 116, described above with respect to FIG. 2. However, combining the functionality of two PSE port units into a single integrated unit reduces the circuit size by eliminating redundant components, resulting in a more reliable and cost effective solution. It is noted that combined PD port unit 242 is capable of performing as described above with respect to FIG. 2, and below with respect to FIG. 10, regardless of whether the power sourcing equipment (PSE) is based on a combined PSE port unit design, as illustrated in FIG. 3 or on a non-combined PSE port unit design, as illustrated in FIG. 2.

Figure 4:
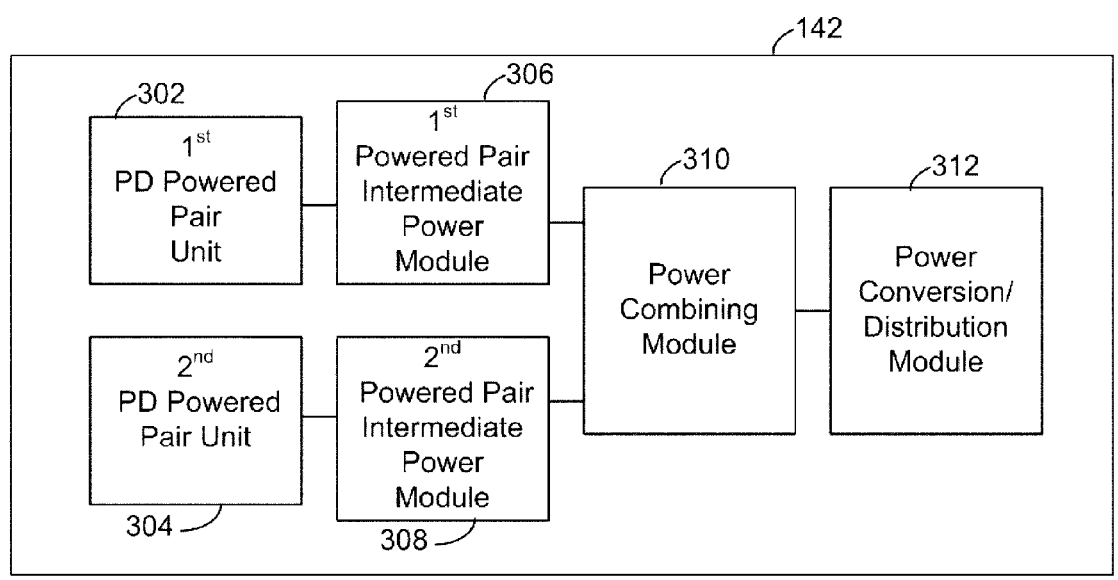
FIG. 4 is a block diagram of a first embodiment of the combined PD port unit shown in FIG. 2 and FIG. 3.

FIG. 4 is a block diagram of one embodiment of the combined PD port unit 142, 242 described above with respect to FIG. 2 and FIG. 3. As shown in FIG. 4, a first embodiment of combined PD port unit 142, 242 includes a first PD powered pair unit 302, a second PD powered pair unit 304, a first powered pair intermediate power module 306, a second powered pair intermediate power module 308, a power combining module 310 and a power conversion/distribution module 312.

In operation, first PD powered pair unit 302 provides power sourcing equipment (PSE) 102, 202 with an initial PD sense feedback based on a predetermined resistance placed by first PD powered pair unit 302 across tap connection 136. Unit 302 receives an initial level of PoE power from PSE 102, 202 and, based on circuitry within first PD powered pair unit 302 powered with the initial level of PoE power, performs a subsequent PD/PSE PoE power negotiation with power sourcing equipment (PSE) 102, 202 that results in a higher level of power, i.e., a negotiated power level, being delivered from power sourcing equipment (PSE) 102 to combined PD port unit 142, 242.

First powered pair intermediate power module 306 receives PoE power received from power sourcing equipment (PSE) 102, 202 based on negotiations performed by first PD powered pair unit 302 and converts the received power to an intermediate voltage level. In one example embodiment, first powered pair intermediate power module 306 receives PoE at a voltage level between 42 volts and 57 volts, and converts the voltage to an intermediate voltage of, for example, 12 volts.

Second PD powered pair unit 304 and second powered pair intermediate power module 308 operate in the same manner as first PD powered pair unit 302 and first powered pair intermediate power module 306, but are configured to negotiate PoE power from power sourcing equipment (PSE) 102 over a second powered cable pair. For example, with respect to the example PoE service chain described above with respect to FIG. 2 and FIG. 3, first PD powered pair unit 302 and first powered pair intermediate power module 306 may be configured to negotiate PoE power from power sourcing equipment (PSE) 102 via a first PoE powered cable pair, e.g., powered cable pair 122, whereas second PD powered pair unit 304 and second powered pair intermediate power module 308 may be configured to negotiate PoE power from power sourcing equipment (PSE) 102 via a second PoE powered cable pair, e.g., powered cable pair 128. First powered pair intermediate power module 306 and second powered cable pair intermediate power module 308 are configured to convert the received PoE power to a common intermediate voltage, e.g., 12 volts.

Power combining module 310 combines the intermediate power generated by first powered pair intermediate power module 306 and the intermediate voltage generated second powered pair intermediate power module 308 into a single power source. Module 310 also has load sharing capabilities so that power imbalances apparent between modules 306, 308 can be mitigated. Module 310 would also be able to use power from only one of the pairs to supply module 312. Combining the power sources leads to a cheaper, more efficient design with fewer redundant components. Power conversion/distribution module 312 receives power from power combining module 310 at the intermediate power and converts the intermediate power to one or more of several different voltages prior to distribution to a designated location. For example, combined PD port unit 142, control circuit 144, base load 146, first optional load 148, and detection unit 158 may require power at one or more different voltage levels. Power conversion/distribution module 312, therefore, converts the intermediate voltage level to the desired voltage levels prior to distribution to the noted components/devices.

Figure 5:
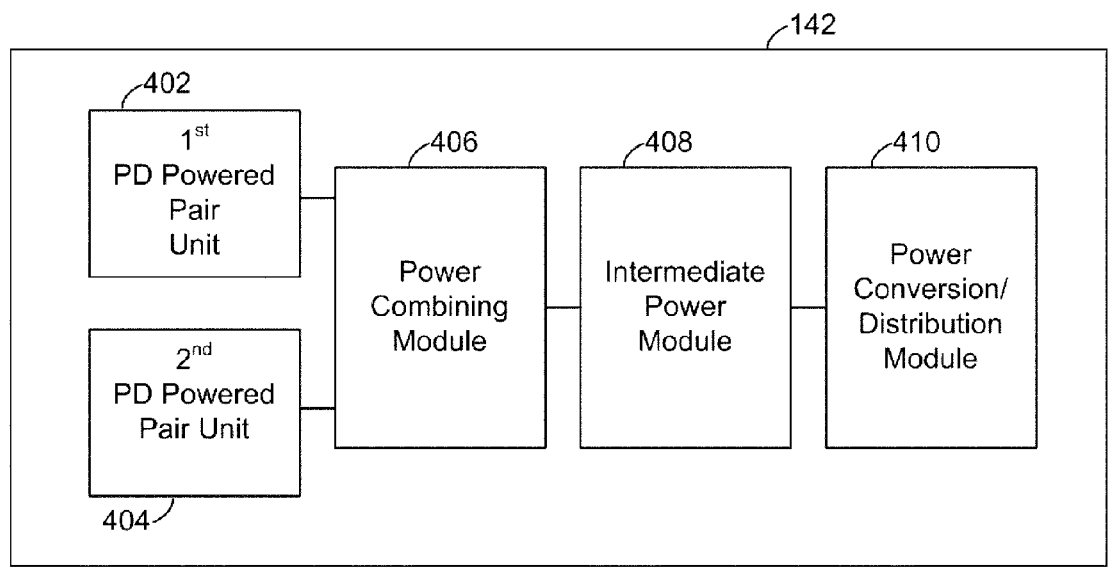
FIG. 5 is a block diagram of another embodiment of the combined PD port unit shown in FIG. 2 and FIG. 3.

FIG. 5 is a block diagram of a second embodiment of the combined PD port unit shown in FIG. 2 and FIG. 3. As shown in FIG. 5, a second embodiment of combined PD port unit 142, 242 includes a first PD powered pair unit 402, a second PD powered pair unit 404, power combining module 406, an intermediate power module 408, and a power conversion/distribution module 410. The second embodiment of combined PD port unit 142, 242 differs from the first embodiment of combined PD port unit 142, 242 described above with respect to FIG. 4 in that power combining module 406 combines the PoE power received over the respective PoE powered pairs via first PD powered pair unit 402 and second PD powered pair unit 404 before the received power is converted to an intermediate voltage.

In operation, PoE power received from power sourcing equipment (PSE) 102 via first PD powered pair unit 402 and a second PD powered pair unit 404 is combined by power combining module 406. Power from the combined power source is then converted to an intermediate voltage level by intermediate power module 408. The combined power at the predetermined intermediate voltage level is then provided to power conversion/distribution module 410 for conversion to specific voltages prior to distribution, as described above.

Figure 6:
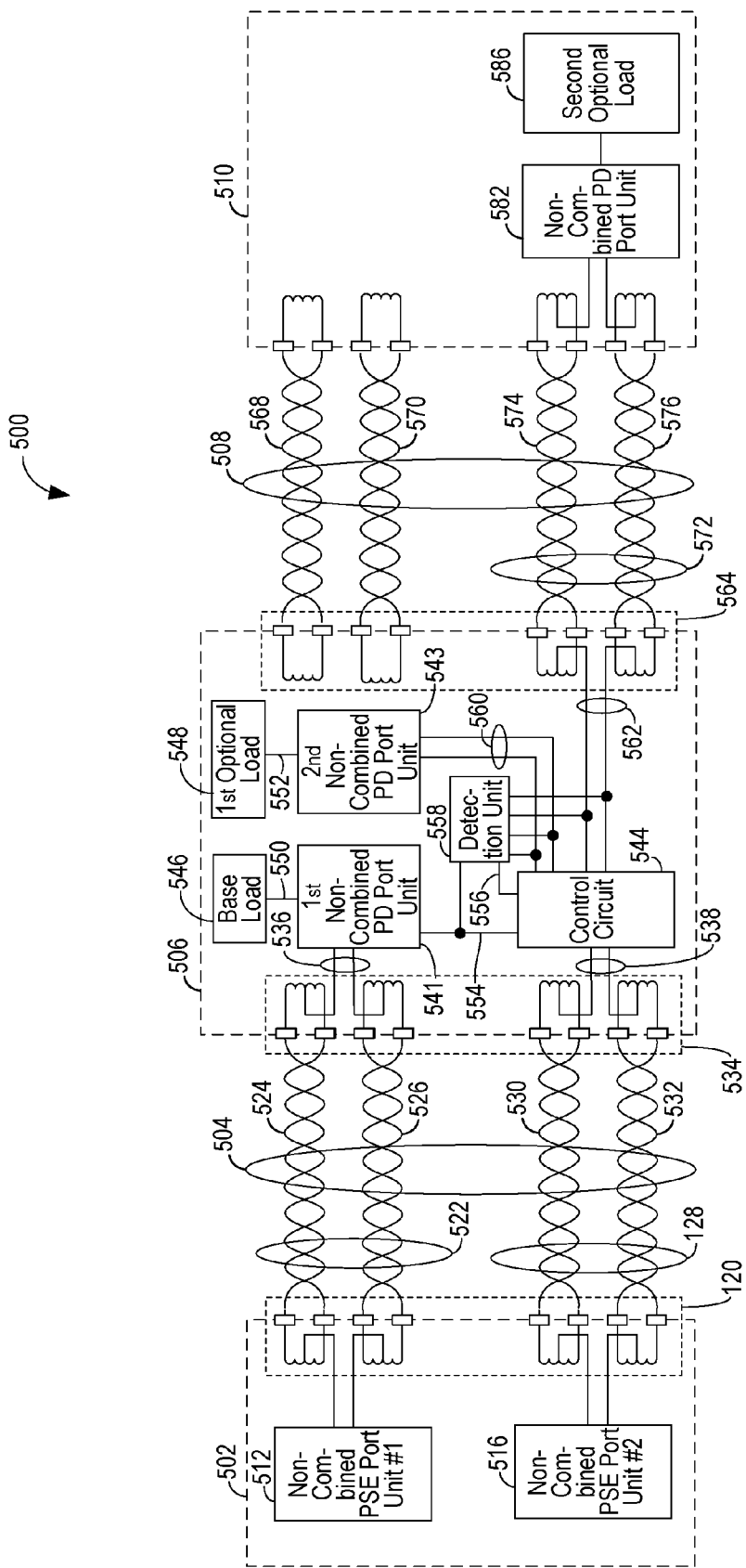
FIG. 6 is a schematic diagram of a PoE service chain that includes another embodiment of the described powered device.

FIG. 6 is a schematic diagram of a PoE service chain 500 that is similar to PoE service chain 100, described above with respect to FIG. 2. Components in PoE service chain 500 which are identical to corresponding components in PoE service chain 100 have been provided with numeric labels that match the numeric label of the corresponding feature described above with respect to FIG. 2. Only the first digit of each numeric label has been changed to correspond to the new figure number. For example, power sourcing equipment 502, first communication cable 504, second communication cable 508 and second powered device 510 are identical in configuration and function to corresponding components described above with respect to FIG. 2. Components that remain the same in FIG. 6 as the corresponding component described above with respect to FIG. 2 will not again be described.

Powered device 506 differs from powered device 106, described above with respect to FIG. 2, in that the functionality performed by combined PD port unit 142 in powered device 106 is performed by 2 separate PD port units, i.e., first non-combined PD port unit 541 and second non-combined PD port unit 543 each connected to the base load 546 and the first optional load 548 by power leads 550 and 552 respectively. Power to control circuit 544 through power lead 554 and detection unit 558 is also controlled by first non-combined PD port unit 541. Power to first optional load 548 is controlled by second non-combined PD port unit 543.

With respect to powered device 506, first non-combined PD port unit 541 is configured to support PoE negotiation with power sourcing equipment (PSE) 502 over powered cable pair 522. In one embodiment, first non-combined PD port unit 541 provides power sourcing equipment (PSE) 502 with an initial PD sense feedback based on a predetermined resistance placed across tap connection 536. Upon sensing the predetermined resistance, power sourcing equipment (PSE) 502 provides first non-combined PD port unit 541 with a predetermined initial power level that is used by non-combined PD port unit 541 to power-up enough circuitry to conduct subsequent PoE power negotiations with power sourcing equipment (PSE) 502. Upon receipt of the higher, negotiated power level, first non-combined PD port unit 541 delivers power to and initiates a startup of base load 546 circuitry, detection unit 558 and control circuit 544.

Upon startup, detection unit 558 tests monitoring leads 560 and tap connection 562 to determine whether first optional load 548 and second optional load 586, respectively, are present. For example, detection unit 558 may test for the presence of a predetermined resistance on each of the respective leads, and if the predetermined resistance is located, detection unit 558 reports to control circuit 544 that the respective load is present. Upon startup, control circuit 544 awaits detection information from detection unit 558. If first optional load 548 is detected, control circuit 544 connects taps 538 from second powered cable pair 528 of cable 504 to second non-combined PD port unit 543. If first optional load 548 is not detected and second optional load 586 is detected, control circuit 544 connects taps 538 from second powered cable pair 528 of cable 504 to power taps 562 on or associated with powered pair 572 within cable 508.

Connecting the taps 538 from second powered cable pair 528 of cable 504 to second non-combined PD port unit 543 allows second non-combined PD port unit 543 to perform PD/PSE PoE power negotiation with power sourcing equipment (PSE) 502 over second powered cable pair 528. Once a negotiated power level is received, non-combined PD port unit 543 provides power to first optional load 548. Connecting taps 538 from second powered cable pair 528 of cable 504 to power taps 562 on powered cable pair 572 within cable 508 allows non-combined PD port unit 582 to perform PD/PSE PoE power negotiation with power sourcing equipment (PSE) 502. Once a negotiated power level is received, non-combined PD port unit 582 provides power to second optional load 586.

Figure 7:
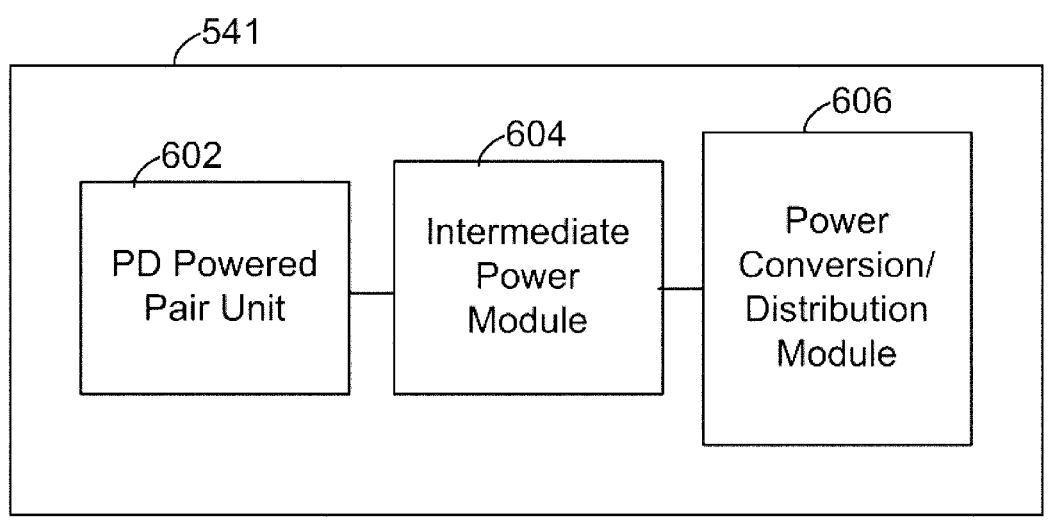
FIG. 7 is a block diagram of an embodiment of the non-combined PD port unit shown in FIG. 6.

FIG. 7 is a block diagram of an embodiment of the non-combined PD port units, e.g., first non-combined PD port unit 541, second non-combined PD port unit 543, and non-combined PD port unit 582, shown in FIG. 6. As shown in FIG. 6, a non-combined PD port unit, e.g., non-combined PD port unit 541, includes a PD powered pair unit 602, an intermediate power module 604, and a power conversion/distribution module 606. The non-combined PD port unit 541 differs from the combined PD port unit 142 described above with respect to FIG. 4 and FIG. 5 in that there is only a single PD powered pair unit and there is no power combining module.

In operation, PoE power received from power sourcing equipment (PSE) 502 via PD powered pair unit 602 is converted to an intermediate voltage level by intermediate power module 604. The predetermined intermediate voltage level is then provided to power conversion/distribution module 606 for conversion to specific voltages prior to distribution, as described above.

In example powered device embodiments, a non-combined PSE port unit described above with respect to FIG. 6 and FIG. 7, and below with respect to FIG. 8 and FIG. 9, could be implemented with 802.3af or 802.3at compliant PD components performing PoE standards compliant processing. Each standards compliant PD component may be configured within first powered device 506 and/or second powered device 510, as described above with respect FIG. 6, thereby allowing the standards compliant components to support the described functionality, and to support example process flows, such as those process flows described below with respect to FIG. 11 through FIG. 13.

Further, in example powered device embodiments, any number of non-combined PSE port units may be used to meet the power demands of the described powered device and/or the power demands of any number of powered devices connected to the described powered device via pass through ports. For example, a powered device 506 described above with respect to FIG. 6 that is capable of receiving two 8-wire communication cables from PSE 502, instead of the one PSE-to-PD communication cable shown in FIG. 6, can include 2 additional non-combined PD port units. An added non-combined PD port unit that is to provide power to a second base load, i.e., another non-optional permanent load similar to base load 546, may be connected directly to the wire taps of the PoE powered pair on which PoE power is received. An added non-combined PD port unit that is to provide power to another optional load within the powered device, i.e., another optional load similar to optional load 548, may be connected to the wire taps of the PoE powered pair on which PoE power is received via control circuit 544. While FIG. 6 has 502 with non-combined PSEs it may also utilize a combined PSE source like 202 in FIG. 3.

In a powered device embodiment, similar to powered device 506 described above with respect to FIG. 6 but that is configured to receive multiple PoE enabled communication cables from PSE 502, detection unit 558 may be adapted to monitor for the presence of any number of optional loads and may be configured to provide information related to the optional loads detected to control circuit 544. Similarly, control circuit 544 may be adapted to connect to any number of PoE powered pair wire taps, similar to wire taps 538, and may be configured to connect the respective wire taps to any number of added non-combined PD port units supporting the respective optional loads. Such added non-combined PD port units and their respective optional loads can be located within the powered device, or may reside within another powered device connected by one of any number of pass-through ports, e.g., similar to pass-through port 564, as described above with respect to FIG. 6.

In one example powered device embodiment, the priority with which control circuit 544 distributes PoE power to the respective optional loads is controlled by hard-wired circuitry included within control circuit 544. In another example powered device embodiment, the priority with which control circuit 544 distributes PoE power to the respective optional loads is controlled by one or more manually set switches, e.g., a dual in-line package (DIP) switches or other manually configurable switches that are used to set the priority with which each optional load is powered. Other embodiments may use digitally controlled switches rather than the manually set switches. In yet another example powered device embodiment, control circuit 544 includes a priority control unit that determines a priority of the respective optional loads based on a polling of the respective optional loads, e.g., by polling an initial PD sense feedback resistance placed across monitoring leads, e.g., such as monitoring leads 560 described above with respect to FIG. 6. In still yet another example powered device embodiment, detection unit 558 includes a priority control unit that determines a priority of the respective optional loads based on a polling of the respective optional loads, e.g., by polling an initial PD sense feedback resistance placed across monitoring leads, e.g., such as monitoring leads 560 described above with respect to FIG. 6. Based on the resistance sensed by detection unit 558, the priority control unit determines a priority for each optional load and provides the priority information to control circuit 544.

Further, a non-combined PD port unit embodiment, such as non-combined PD port unit 541 described above with respect to FIG. 7, may be configured to support a multi-part optional load. In such an embodiment, the power conversion/power distribution module 606 includes a priority control unit that distributes received PoE power to the respective loads based on a predetermined, or dynamically determined priority. In such an embodiment, the power conversion/power distribution module distributes power based on the determined priority until the available power is fully allocated.

Embodiments of control circuit 544 and power conversion/power distribution module 606 that distribute power based on a determined priority may further monitor an amount of power being consumed by the respective loads. Control circuit 544 and power conversion/power distribution module 606 may terminate power to one or more loads based on an amount of power available, and the determined priority of the load. Control circuit 544 and power conversion/power distribution module 606 may also be configured to terminate power to one or more loads in response to a command received by the powered device via a communication control line.

Figure 8:
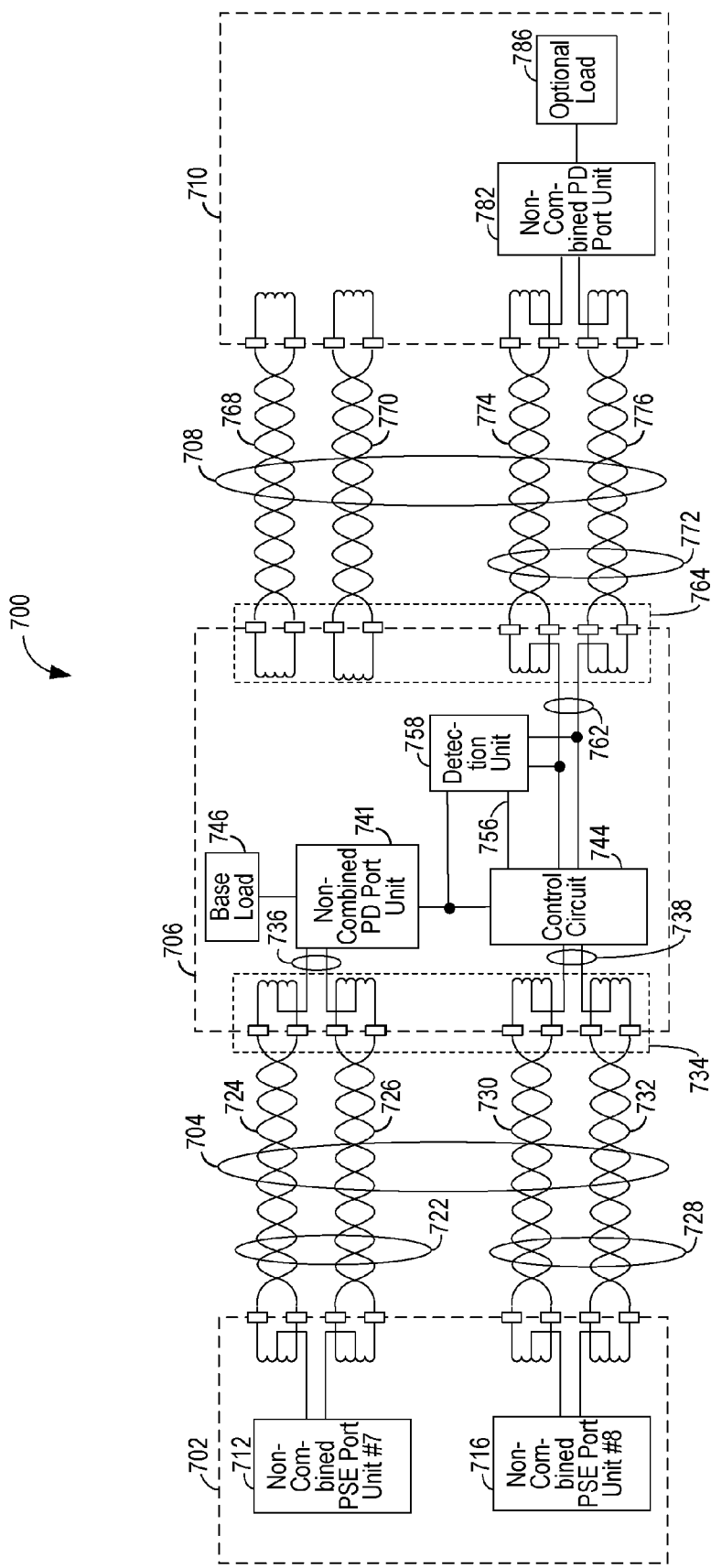
FIG. 8 is a schematic diagram of a PoE service chain that includes another embodiment of the described powered device.

FIG. 8 is a schematic diagram of a PoE service chain 700 that is similar to PoE service chain 500, described above with respect to FIG. 6. Components in PoE service chain 700 which are identical to corresponding components in PoE service chain 500 have been provided with numeric labels that match the numeric label of the corresponding feature described above with respect to FIG. 6. Only the first digit of each numeric label has been changed to correspond to the new figure number. For example, power sourcing equipment 702, first communication cable 704, second communication cable 708 and second powered device 710 are identical in configuration and function to corresponding components described above with respect to FIG. 6. Components that remain the same in FIG. 8 as the corresponding component described above with respect to FIG. 6 will not again be described.

Powered device 706 differs from powered device 506, described above with respect to FIG. 6, in that there is only a single PD port unit and there is no optional load within the powered device. Power to base load 746, control circuit 744 and detection unit 758 is controlled by non-combined PD port unit 741.

With respect to powered device 706, non-combined PD port unit 741 is configured to support PoE negotiation with power sourcing equipment (PSE) 702 over powered cable pair 722. In one embodiment, non-combined PD port unit 741 provides power sourcing equipment (PSE) 702 with an initial PD sense feedback based on a predetermined resistance placed across tap connection 736. Upon sensing the predetermined resistance, power sourcing equipment (PSE) 702 provides non-combined PD port unit 741 with a predetermined initial power level that is used by non-combined PD port unit 741 to power-up enough circuitry to conduct subsequent PoE power negotiations with power sourcing equipment (PSE) 702. Upon receipt of the higher, negotiated power level, non-combined PD port unit 741 delivers power to and initiates a startup of base load 746 circuitry, detection unit 758 and control circuit 744.

Upon startup, detection unit 758 tests tap connection 762 to determine whether second optional load 786 is present. For example, detection unit 758 may test for the presence of a predetermined resistance, and if the predetermined resistance is located, detection unit 758 reports to control circuit 744 that optional load 786 is present. Upon startup, control circuit 744 awaits detection information from detection unit 558. If optional load 786 is detected, control circuit 744 connects taps 738 from second powered pair 728 of cable 704 to power taps 762 on powered pair 772 within cable 708.

Figure 9:
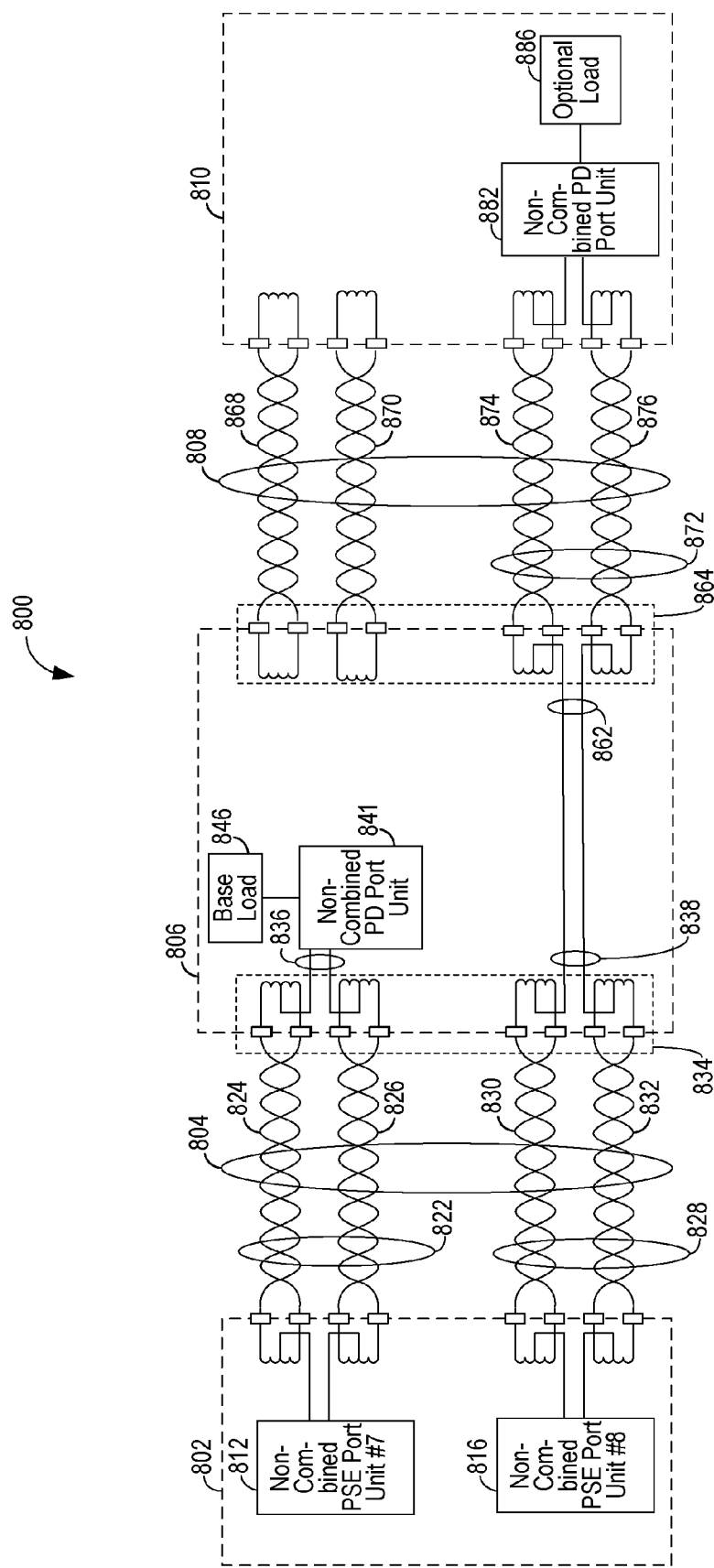
FIG. 9 is a schematic diagram of a PoE service chain that includes still another embodiment of the described powered device.

FIG. 9 is a schematic diagram of a PoE service chain 800 that is similar to PoE service chain 700, described above with respect to FIG. 8. Components in PoE service chain 800 which are identical to corresponding components in PoE service chain 700 have been provided with numeric labels that match the numeric label of the corresponding feature described above with respect to FIG. 8. Only the first digit of each numeric label has been changed to correspond to the new figure number. For example, power sourcing equipment 802, first communication cable 804, second communication cable 808 and second powered device 810 are identical in configuration and function to corresponding components described above with respect to FIG. 8. Components that remain the same in FIG. 9 as the corresponding component described above with respect to FIG. 8 will not again be described.

Powered device 806 differs from powered device 706, described above with respect to FIG. 8, in that there is no corresponding detection unit or control circuit. These components are not needed because in powered device 806, taps 838 from second powered cable pair 828 of cable 804 are permanently connected to power taps 862 on powered cable pair 872 within cable 808.

With respect to powered device 806, non-combined PD port unit 841 is configured to support PoE negotiation with power sourcing equipment (PSE) 802 over powered pair 822. In one embodiment, non-combined PD port unit 841 provides power sourcing equipment (PSE) 802 with an initial PD sense feedback based on a predetermined resistance placed across tap connection 836. Upon sensing the predetermined resistance, power sourcing equipment (PSE) 802 provides non-combined PD port unit 841 with a predetermined initial power level that is used by non-combined PD port unit 841 to power-up enough circuitry to conduct subsequent PoE power negotiations with power sourcing equipment (PSE) 802. Upon receipt of the higher, negotiated power level, non-combined PD port unit 841 delivers power to and initiates a startup of base load 846 circuitry.

Figure 10:
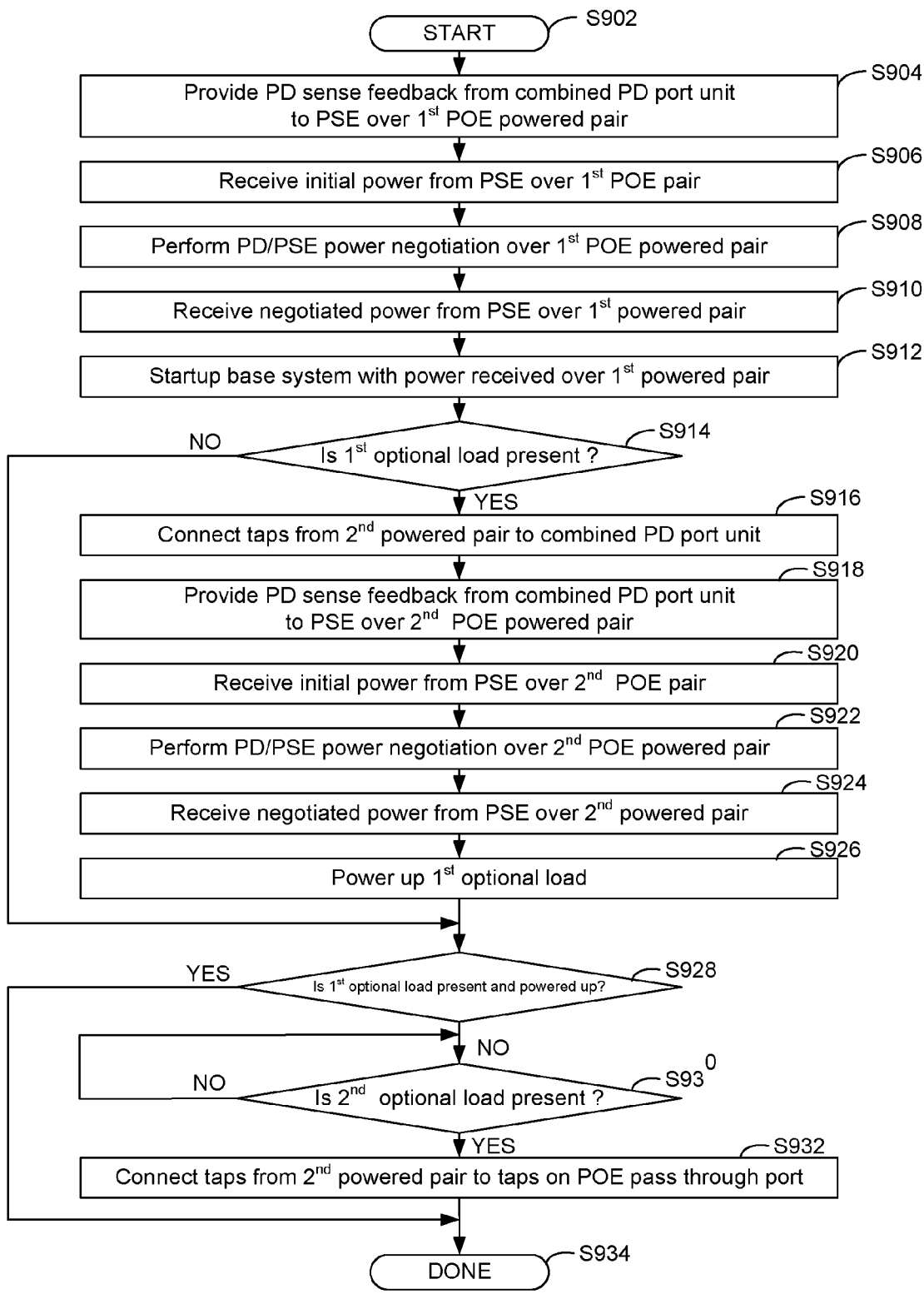
FIG. 10 is a flow-chart of an example process performed by the embodiment of the powered device described above with respect to FIG. 2 and FIG. 3.

FIG. 10 is a flow-chart of an example process performed by a powered device (PD) configured with a combined PD port unit 142 and an optionally powered PoE pass-through port 164, as described above with respect to FIG. 2 and FIG. 3. As shown in FIG. 10, operation of the process begins at S902 and proceeds to S904.

At S904, a first PD powered pair unit, e.g., PD powered port unit 302 described with respect to FIG. 4 or PD powered port unit 402 described with respect to FIG. 5 within combined PD port unit 142, presents a PD sense feedback, e.g., a predetermined resistance, to a PSE port unit, e.g., a non-combined PSE port unit 112 described above with respect to FIG. 2 or combined PSE port unit 202 described above with respect to FIG. 3, over first powered pair 122 within cable 104 and operation of the process continues at S906.

At S906, the first PD powered pair unit receives a predetermined initial level of PoE power over first PoE powered pair 122, and operation of the process continues at S908.

At S908, the first PD powered pair unit powers up and performs a PoE PD/PSE power negotiation with the PSE port unit over first PoE powered pair 122, and operation of the process continues at S910.

At S910, the first PD powered pair unit receives the negotiated power level from the PSE port unit over the first PoE powered pair 122, and operation of the process continues at S912.

At S912, combined PD port unit 142 provides power to base load 146 to initiate a startup of the base system, provides power to detection unit 158, and provides power to control circuit 144, and operation of the process continues at S914.

At S914, if detection unit 158 detects the presence of a first optional load, e.g., by detecting a predetermined resistance across wire-pair 160 shown in FIG. 2 and FIG. 3, operation of the process continues at S916; otherwise, operation of the process continues at S928.

At S916, control circuit 144 connects taps 138 from second powered pair 128 of cable 104 to combined PD port unit 142, and operation of the process continues at S918.

At S918, a second PD powered pair unit, e.g., PD powered port unit 304 described with respect to FIG. 4 or PD powered port unit 404 described with respect to FIG. 5 within combined PD port unit 142, presents a PD sense feedback, e.g., a predetermined resistance, to a PSE port unit, e.g., a second non-combined PSE port unit 116 described above with respect to FIG. 2 or combined PSE port unit 202 described above with respect to FIG. 3, over second powered pair 128 within cable 104, and operation of the process continues at S920.

At S920, the second PD powered pair unit receives a predetermined initial level of PoE power over the second PoE powered pair 128, and operation of the process continues at S922.

At S922, the second PD powered pair unit powers up and performs a PoE PD/PSE power negotiation with the PSE port unit over the second PoE powered pair 128, and operation of the process continues at S924.

At S924, the second PD powered pair unit receives the negotiated power level from the PSE port unit over the second PoE powered pair 128, and operation of the process continues at S926.

At S926, combined PD port unit 142 provides power to first optional load 148 to initiate a startup of the circuitry associated with the first optional load 148, and operation of the process continues at S928.

At S928, if detection unit 158 does not detect the presence of a first optional load, operation of the process continues at S930; otherwise, operation of the process continues at S934.

At S930, if detection unit 158 detects the presence of a second optional load, operation of the process continues at S932; otherwise, operation of the process continues at S934.

At S932, control circuit 144 connects taps 138 from second powered pair 128 of cable 104 to corresponding power taps 162 on powered cable pair 172 within cable 108, and operation of the process continues at S934. In connecting the second optional load, power negotiation would be performed for second optional load and related to PD Port Unit 582.

Operation of the process concludes at S934.

Figure 11:
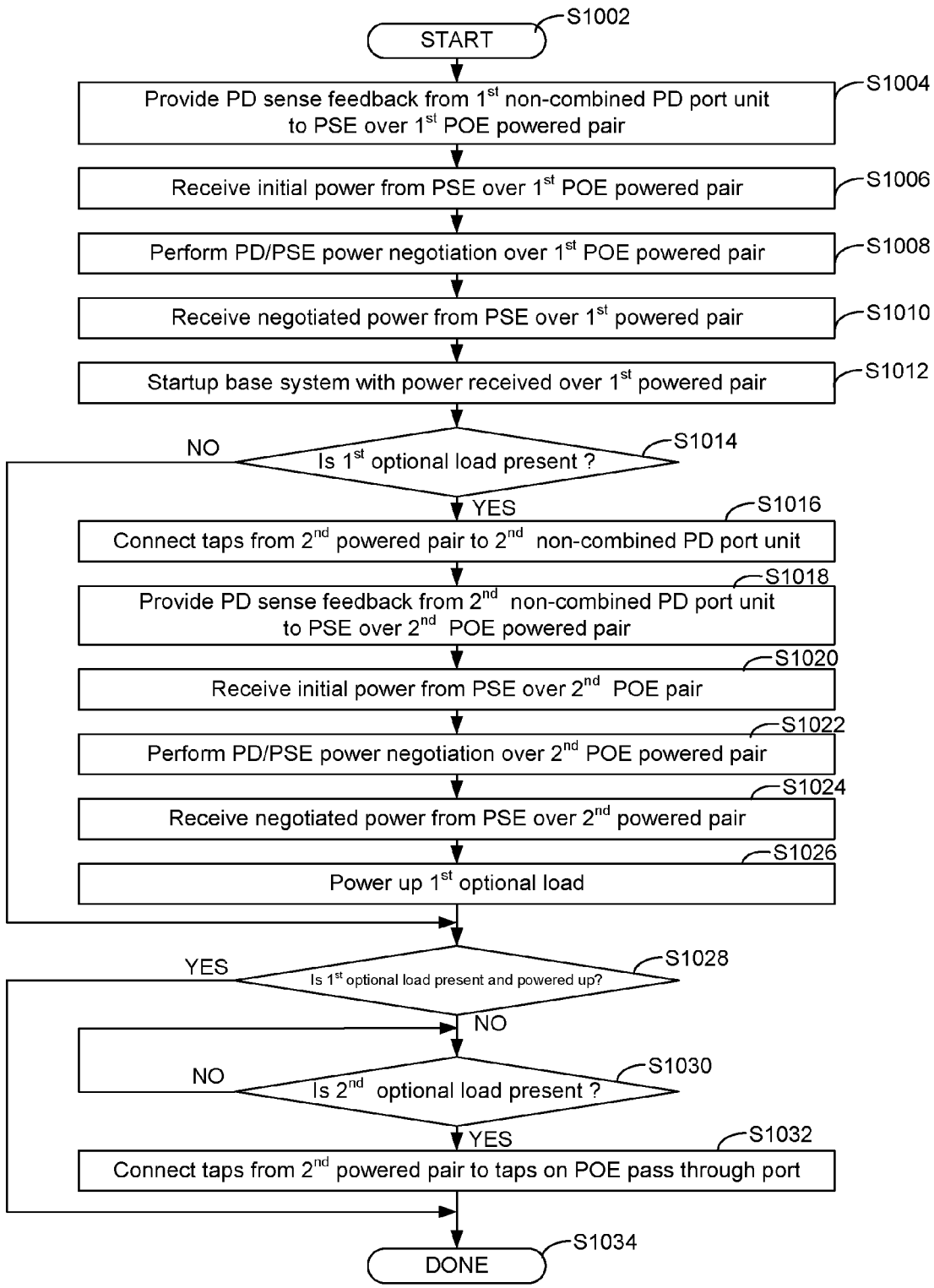
FIG. 11 is a flow-chart of an example process performed by the embodiment of the powered device described above with respect to FIG. 6.

FIG. 11 is a flow-chart of an example process performed by a powered device configured with non-combined PD port units, e.g., non-combined PD port unit 541 and non-combined PD port unit 543 described above with respect to FIG. 6 and an optionally powered PoE pass-through port 564, as described above with respect to FIG. 6. As shown in FIG. 11, operation of the process begins at S1002 and proceeds to S1004.

At S1004, a first non-combined PD port unit 541, e.g., described above with respect to FIG. 6, presents a PD sense feedback, e.g., a predetermined resistance, to a PSE port unit, e.g., a non-combined PSE port unit 512 or combined PSE port unit 202 described above with respect to FIG. 3, over first powered pair 522 within cable 504 and operation of the process continues at S1006.

At S1006, the first non-combined PD port unit receives a predetermined initial level of PoE power over first PoE powered pair 522, and operation of the process continues at S1008.

At S1008, the first non-combined PD port unit powers up and performs a PoE PD/PSE power negotiation with the PSE port unit over first PoE powered pair 522, and operation of the process continues at S1010.

At S1010, the first non-combined PD port unit receives the negotiated power level from the PSE port unit over the first PoE powered pair 522, and operation of the process continues at S1012.

At S1012, the first non-combined PD port unit provides power to base load 546 to initiate a startup of the base system, provides power to detection unit 558, and provides power to control circuit 544, and operation of the process continues at S1014.

At S1014, if detection unit 558 detects the presence of a first optional load, e.g., by detecting a predetermined resistance across wire-pair 560 shown in FIG. 6, operation of the process continues at S1016; otherwise, operation of the process continues at S1028.

At S1016, control circuit 544 connects taps 538 from second powered pair 528 of cable 504 to second non-combined PD port unit 543, and operation of the process continues at S1018.

At S1018, the second non-combined PD port unit, presents a PD sense feedback, e.g., a predetermined resistance, to a PSE port unit, e.g., a second non-combined PSE port unit 516 described above with respect to FIG. 6 or combined PSE port unit 202 described above with respect to FIG. 3, over second powered pair 528 within cable 504, and operation of the process continues at S1020.

At S1020, the second non-combined PD port unit receives a predetermined initial level of PoE power over the second PoE powered pair 528, and operation of the process continues at S1022.

At S1022, the second non-combined PD port unit powers up and performs a PoE PD/PSE power negotiation with the PSE port unit over the second PoE powered pair 528, and operation of the process continues at S1024.

At S1024, the second non-combined PD port unit receives the negotiated power level from the PSE port unit over the second PoE powered pair 528, and operation of the process continues at S1026.

At S1026, the second non-combined PD port unit provides power to first optional load 548 to initiate a startup of the circuitry associated with the first optional load 548, and operation of the process continues at S1028.

At S1028, if detection unit 558 does not detect the presence of a first optional load, operation of the process continues at S1030; otherwise, operation of the process continues at S1034.

At S1030, if detection unit 558 detects the presence of a second optional load, e.g., by detecting a predetermined resistance across tap-connection 562 shown in FIG. 6, operation of the process continues at S1032; otherwise, operation of the process continues at S1030.

At S1032, control circuit 544 connects taps 538 from second powered pair 528 of cable 504 to corresponding power taps 562 on powered pair 572 within cable 508, and operation of the process continues at S1034. With connection of the second optional load, power negotiation can be performed for second optional load, as noted above.

Operation of the process concludes at S1034.

Figure 12:
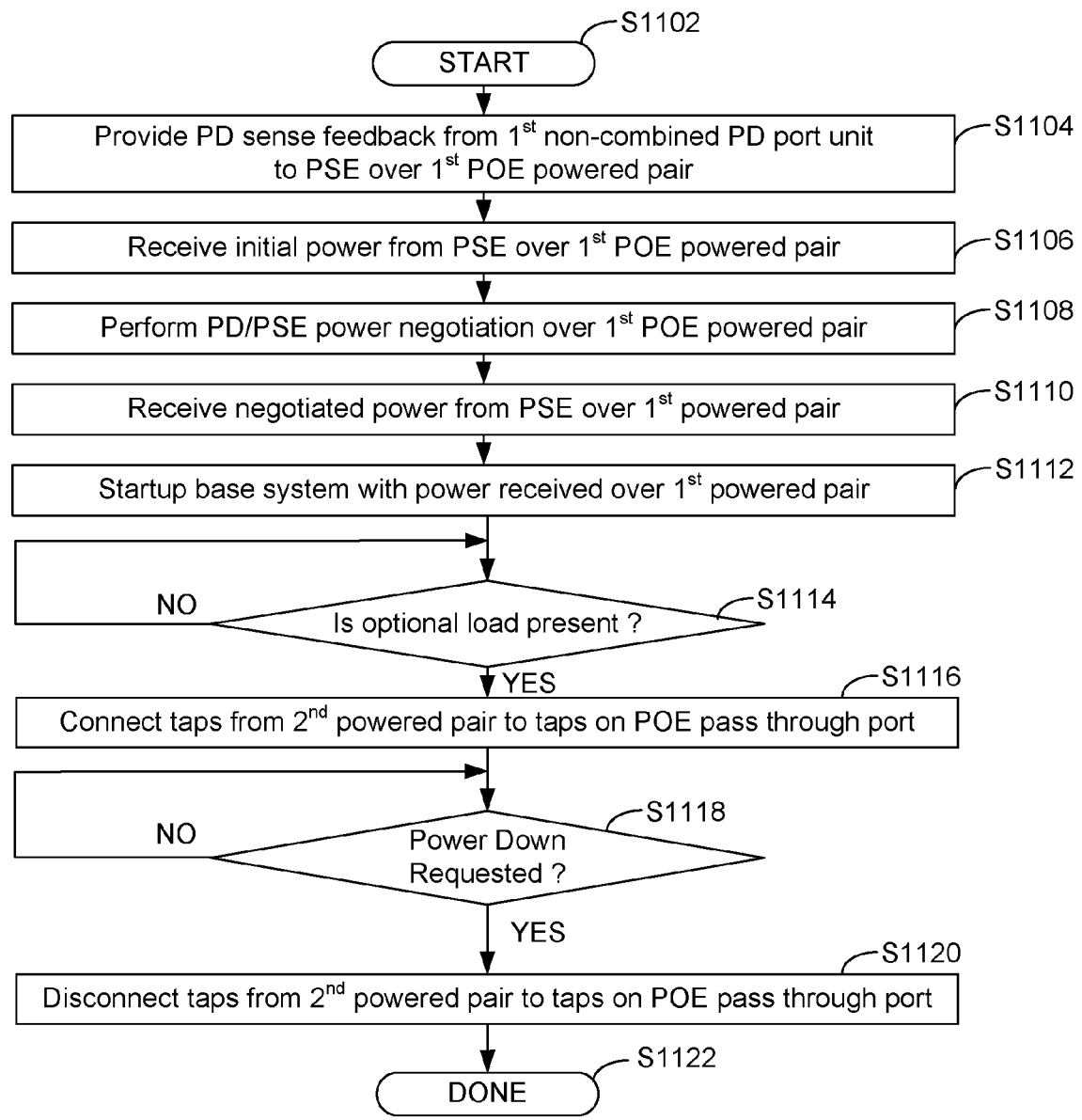
FIG. 12 is a flow-chart of an example process performed by the embodiment of the powered device described above with respect to FIG. 8.

FIG. 12 is a flow-chart of an example process performed by a powered device configured with a single non-combined PD port unit, e.g., non-combined PD port unit 741 described above with respect to FIG. 8 and an optionally powered PoE pass-through port 764, as described above with respect to FIG. 8. As shown in FIG. 12, operation of the process begins at S1102 and proceeds to S1104.

At S1104, a non-combined PD port unit 741, e.g., described above with respect to FIG. 8, presents a PD sense feedback, e.g., a predetermined resistance, to a PSE port unit, e.g., a non-combined PSE port unit 712 or combined PSE port unit 202 described above with respect to FIG. 3, over first powered pair 722 within cable 704 and operation of the process continues at S1106.

At S1106, the non-combined PD port unit receives a predetermined initial level of PoE power over first PoE powered pair 722, and operation of the process continues at S1108.

At S1108, the non-combined PD port unit powers up and performs a PoE PD/PSE power negotiation with the PSE port unit over first PoE powered pair 722, and operation of the process continues at S1110.

At S1110, the first non-combined PD port unit receives the negotiated power level from the PSE port unit over the first PoE powered pair 722, and operation of the process continues at S1112.

At S1112, the first non-combined PD port unit provides power to base load 746 to initiate a startup of the base system, provides power to detection unit 758, and provides power to control circuit 744, and operation of the process continues at S1114.

At S1114, if detection unit 758 detects the presence of a second optional load, e.g., by detecting a predetermined resistance across wire-pair 762 shown in FIG. 8, operation of the process continues at S1116; otherwise, operation of the process continues at S1114.

At S1116, control circuit 744 connects taps 738 from second powered pair 728 of cable 704 to corresponding power taps 762 on powered pair 772 within cable 708, and operation of the process continues at S1118. Power for optional load 786 is negotiated accordingly.

At S1118, if detection unit 758 detects that a power down has been initiated, operation of the process continues at S1120.

At S1120, the second pair of powered taps are disconnected from the PoE pass-through port 864. Operation of the process concludes at S1122.

Figure 13:
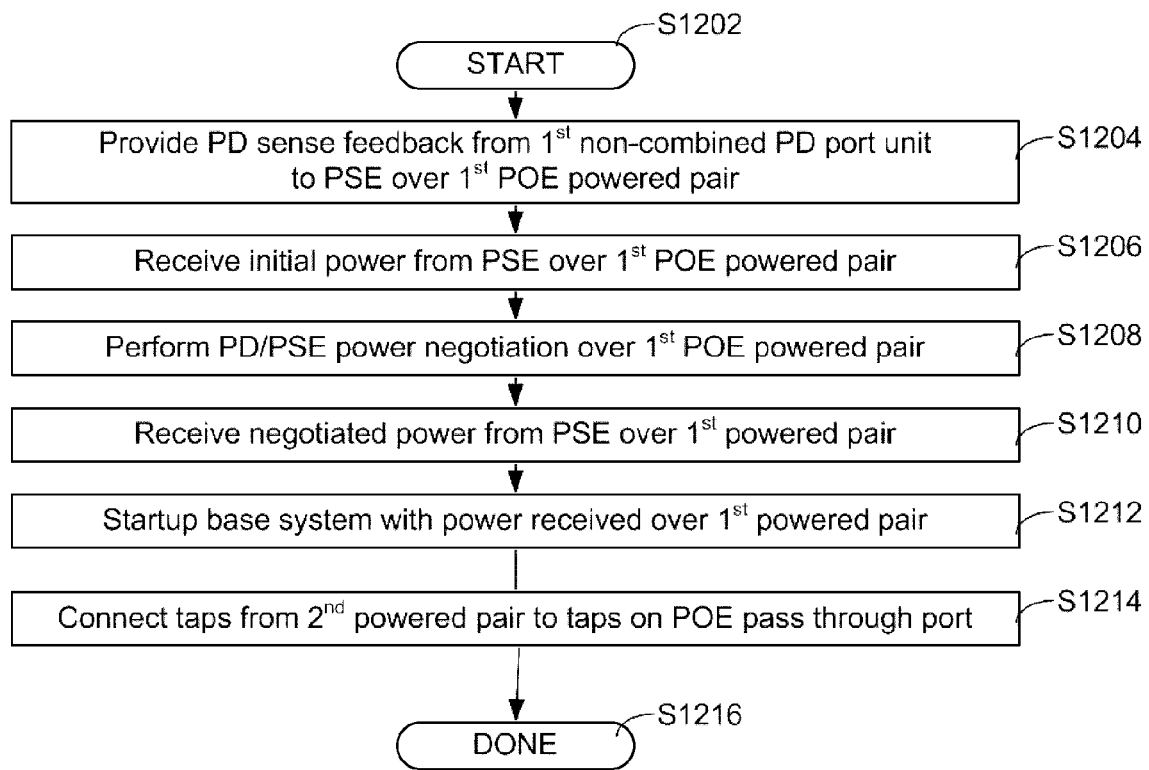
FIG. 13 is a flow-chart of an example process performed by the embodiment of the powered device described above with respect to FIG. 9.

FIG. 13 is a flow-chart of an example process performed by a powered device configured with a single non-combined PD port unit, e.g., non-combined PD port unit 841 described above with respect to FIG. 9 and a powered PoE pass-through port 864, as described above with respect to FIG. 9. As shown in FIG. 13, operation of the process begins at S1202 and proceeds to S1204.

At S1204, a non-combined PD port unit 841, e.g., described above with respect to FIG. 9, presents a PD sense feedback, e.g., a predetermined resistance, to a PSE port unit, e.g., a non-combined PSE port unit 812 or combined PSE port unit 202 described above with respect to FIG. 3, over first powered pair 822 within cable 804 and operation of the process continues at S1206.

At S1206, the non-combined PD port unit receives a predetermined initial level of PoE power over first PoE powered pair 822, and operation of the process continues at S1208.

At S1208, the non-combined PD port unit powers up and performs a PoE PD/PSE power negotiation with the PSE port unit over first PoE powered pair 822, and operation of the process continues at S1210.

At S1210, the first non-combined PD port unit receives the negotiated power level from the PSE port unit over the first PoE powered pair 822, and operation of the process continues at S1212.

At S1212, the first non-combined PD port unit provides power to base load 846 to initiate a startup of the base system, and operation of the process continues at S1214.

At S1214, taps 838 of port 834 are permanently connected to corresponding power taps 862 on powered PoE pass-through port 864 thereby allowing non-combined PD port unit 882 within powered device 810 to provide a PD sense feedback and to perform PoE PD/PSE power negotiation directly with a PSE port unit, e.g., a non-combined PSE port unit 816 or combined PSE port unit 202 described above with respect to FIG. 3.

Figure 14:
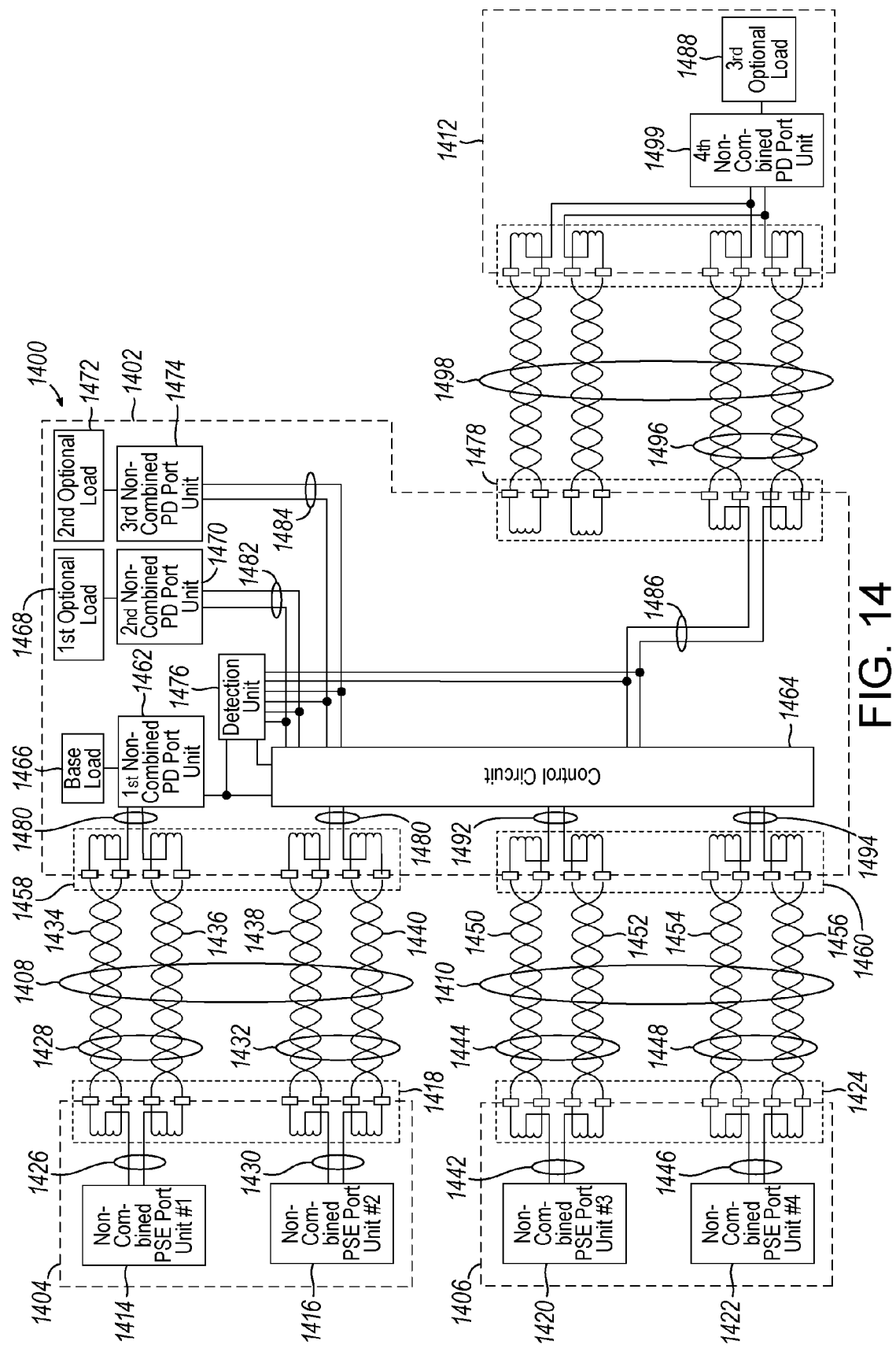
FIG. 14 is a schematic diagram of an example PoE service chain having multiple cables and includes an embodiment of the described powered device.

FIGS. 2, 3, and 6 illustrate single cable embodiments of the invention. Though, other multi-cable embodiments may employ 2 or more cables. For example, and turning now to the schematic diagram in FIG. 14, is a schematic diagram of a PoE service chain 1400 for use in a communication system or device in which a first powered device (PD) 1402 embodiment receives PoE power from power sourcing equipment (PSE) 1404 and 1406 via conductors or wire pairs within communication cables 1408, 1410, similar to the embodiment illustrated in FIG. 6. The PD 1402 selectively delivers the received PoE power to power loads within the PD 1402, or to a second powered device 1412 via a pass through communication port or to both, based on a set of determined priorities and/or detected loads according to the invention. As with the embodiment in FIG. 6, the powered devices 1402, 1412 may contain a PD port unit which contains electronic circuitry including a PD controller/interface as well as Ethernet magnetics which are configured to extract power from CATx cables, for example.

In this illustrated embodiment, power sourcing equipment 1404 may include a first non-combined PSE port unit 1414, a second non-combined PSE port unit 1416, and a PoE enabled communication port 1418 that is operably coupled to the units 1414, 1416. Similarly, power sourcing equipment 1406 may include a third non-combined PSE port unit 1420, a fourth non-combined PSE port unit 1422, and a PoE enabled communication port 1424 that is operably coupled to the units 1420, 1422. Other embodiments may employ a combined PSE port such as PSE port 512 in FIG. 6, or a combination of combine and uncombined PSE ports. The PSE port units 1414, 1416, 1420, 1422 similarly contain electronic circuitry including a PSE controller/interface and Ethernet magnetics configured to allow the application and control of power on cables, such as CATx cables. While FIG. 14 shows units 1414 and 1416 co-located in element 1404 and units 1420 and 1422 co-located in element 1406, any of the units may be in separate locations or components.

First non-combined PSE port unit 1414 connects via tap connection 1426 to a first powered cable pair 1428 of a communication cable 1408 connected to PoE enabled communication port 1418. Second non-combined PSE port unit 1416 connects via tap connection 1430 to a second powered cable pair 1432 of communication cable 1408. The set or cable pair 1428 includes wire pair 1434 and wire pair 1436. Similarly, cable pair 1432 includes wire pairs 1438 and 1440.

Similarly, third non-combined PSE port unit 1420 connects via tap connection 1442 to a first powered cable pair 1444 of a communication cable 1410 connected to PoE enabled communication port 1424. Fourth non-combined PSE port unit 1422 connects via tap connection 1446 to a second powered cable pair 1448 of communication cable 1410. The set or cable pair 1444 includes wire pair 1450 and wire pair 1452. Similarly, cable pair 1448 includes wire pairs 1454 and 1456.

First non-combined PD port unit 1462 is configured to support PoE negotiation with power sourcing equipment (PSE) 1404 over powered cable pair 1428. In one embodiment, first non-combined PD port unit 1462 provides power sourcing equipment (PSE) 1404 with an initial PD sense feedback based on a predetermined resistance placed across tap connection 1480. Upon sensing the predetermined resistance, power sourcing equipment (PSE) 1404 provides first non-combined PD port unit 1462 with a predetermined initial power level that is used by non-combined PD port unit 1462 to power-up enough circuitry to conduct subsequent PoE power negotiations with power sourcing equipment (PSE) 1404. Upon receipt of the higher, negotiated power level, first non-combined PD port unit 1462 delivers power to and initiates a startup of base load 1466 circuitry, detection unit 1476 and control circuit 1464.

Upon startup, detection unit 1476 tests monitoring leads 1482, 1484 and tap connection 1486 to determine whether first optional load 1468, second option load 1472 and third optional load 1488, respectively, are present. For example, detection unit 1476 may test for the presence of a predetermined resistance on each of the respective leads, and if the predetermined resistance is located, detection unit 1476 reports to control circuit 1464 that the respective load is present. Upon startup, control circuit 1464 awaits detection information from detection unit 1476. If first optional load 1468 is detected, control circuit 1464 may connect any of taps 1490, 1492, 1494 from powered cable pairs 1432, 1444, and 1448 of cables 1408 and 1410 to second non-combined PD port unit 1470. If first optional load 1468 is not detected and second optional load 1472 is detected, control circuit 1464 may connect any of taps 1490, 1492, 1494 from powered cable pairs 1432, 1444, and 1448 of cables 1408 and 1410 to third non-combined PD port unit 1474. Otherwise, control circuit may connect any of taps 1490, 1492, 1494 from powered cable pairs 1432, 1444, and 1448 of cables 1408 and 1410 to power taps 1486 on or associated with powered pair 1496 within cable 1498.

Connecting any of taps 1490, 1492, 1494 from powered cable pairs 1432, 1444, and 1448 of cables 1408 and 1410 to second or third non-combined PD port units 1470, 1474 allows second or third non-combined PD port units 1470, 1474 to perform PD/PSE PoE power negotiation with power sourcing equipment (PSE) 1404, 1406 over any of cable pairs 1432, 1444, or 1448. Once a negotiated power level is received, non-combined PD port units 1470 or 1474 provide power to respective first or second optional loads 1468, 1472. Connecting any of taps 1490, 1492, 1494 from powered cable pairs 1432, 1444, and 1448 of cables 1408 and 1410 to power taps 1486 on powered cable pair 1496 within cable 1498 allows a fourth non-combined PD port unit 1499 to perform PD/PSE PoE power negotiation with power sourcing equipment (PSE) 1404 and/or 1406. Once a negotiated power level is received, fourth non-combined PD port unit 1499 provides power to third optional load 1488.

While the embodiment described in FIG. 14 receives its initial power to the first non-combined PD port unit 1462 over cable pairs 1428, any of the cable pairs 1428, 1432, 1444, 1448 may be used to deliver power. Additionally in some embodiments, initial power may also be delivered by a cable pair from each of the 1408 and 1410 connecting both power sourcing equipment (PSE) 1404 and 1406. This configuration may assist in allowing the system and at least the base load to operate if only one PSE 1404, 1406 is supplying power. As also can be seen in the embodiments above, power delivery over cable pairs may include traditional PoE as defined in the PoE standard or power that exceeds or otherwise does not conform to the PoE standard.

Figure 15:
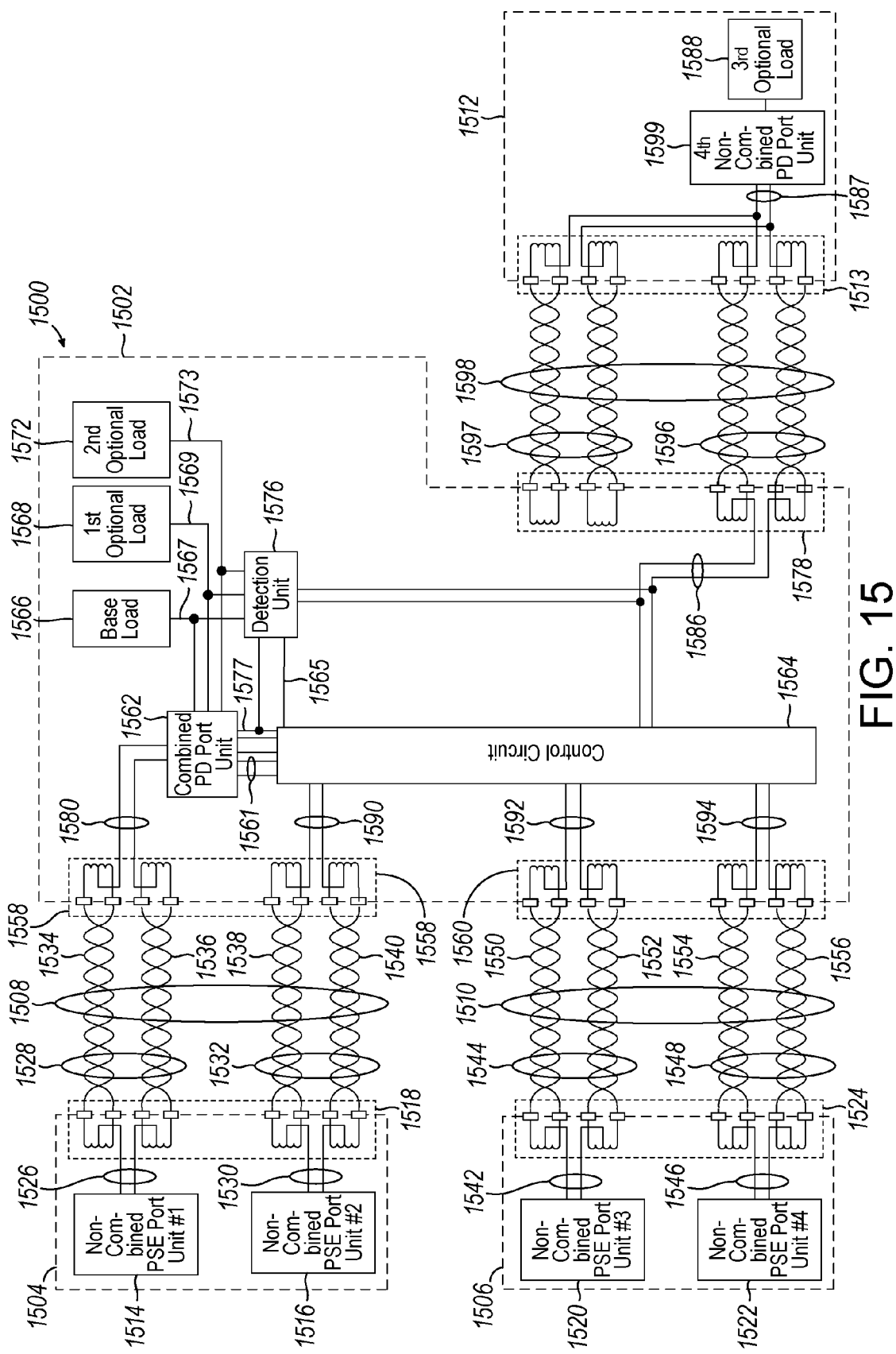
FIG. 15 is a schematic diagram of a second example PoE service chain having multiple cables and includes the powered device of FIG. 14.

Turning now to the schematic diagram in FIG. 15, this schematic diagram illustrates an embodiment of a PoE service chain 1500 for use in a communication system or device in which a first powered device (PD) 1502 embodiment receives PoE power from power sourcing equipment (PSE) 1504 and 1506 via conductors or wire pairs within communication cables 1508, 1510, similar to the embodiment illustrated in FIGS. 2 and 3. Although the embodiment in FIG. 15 shows the use of non-combined PSE port units 1514, 1516, 1520, 1522, combined PSE port units, such as PSE port unit 212 in FIG. 3 may also be used to supply power to the embodiment in FIG. 15 as well as the embodiment in FIG. 14.

Similar to the embodiments described above, the PD 1502 selectively delivers the received PoE power to power loads within the PD 1502, or to an additional powered device 1512 via a pass through communication port or to both, based on a set of determined priorities and/or detected loads according to the invention. The powered devices 1502, 1512 may contain a PD port unit which contains electronic circuitry including a PD controller/interface as well as Ethernet magnetics which are configured to extract power from CATx cables, for example.

As shown in FIG. 15, power sourcing equipment 1504 includes a first non-combined PSE port unit 1514, a second non-combined PSE port unit 1516, and a PoE enabled communication port 1518 that is operably coupled to the units 1514, 1516. Additional power sourcing equipment 1506 includes a third non-combined PSE port unit 1520, a fourth non-combined PSE port unit 1522, and a PoE enabled communication port 1524 that is operably coupled to the units 1520, 1522. The PSE port units contain electronic circuitry including a PSE controller/interface and Ethernet magnetics configured to allow the application and control of power on cables, similar to the embodiments described above. While FIG. 15 shows units 1514, 1516 and units 1520, 1522 co-located in respective elements 1504, 1506, similar to the embodiments discussed above, they might also be in separate locations or components. First non-combined PSE port unit 1514 connects via tap connection 1526 to a first powered cable pair 1528 of a communication cable 1508 connected to PoE enabled communication port 1518. Second non-combined PSE port unit 1516 connects via tap connection 1530 to a second powered cable pair 1532 of communication cable 1508. The set or cable pair 1528 includes wire pair 1534 and wire pair 1536. Similarly, cable pair 1532 includes wire pairs 1538 and 1540. Third non-combined PSE port unit 1520 connects via tap connection 1542 to a first powered cable pair 1544 of a communication cable 1510 connected to PoE enabled communication port 1524. Second non-combined PSE port unit 1522 connects via tap connection 1546 to a second powered cable pair 1548 of communication cable 1510. The set or cable pair 1544 includes wire pair 1550 and wire pair 1552. Similarly, cable pair 1548 includes wire pairs 1554 and 1556.

In this multi-cable embodiment, first powered device 1502 includes a first PoE enabled communication port 1558, a second PoE enabled communication port 1560, a combined PD port unit 1562, a control circuit 1564, a base load 1566, first and second optional loads 1568, 1572, a detection unit 1576, and a pass through communication port 1578 of powered device 1502. Combined PD port unit 1562 connects via tap connection 1580 to powered cable pair 1528 of communication cable 1508 connected to PoE enabled port 1558 of powered device 1502. Unit 1562 also connects to base load 1566 via power lead 1567, connects to first optional load 1568 via power lead 1569, and connects to second optional load 1572 via power lead 1573 to supply power to those loads 1566, 1568, and 1572. The unit 1562 connects to detection unit 1576 and to control circuit 1564 via power lead 1577, and further connects to control circuit 1564 via PoE transfer leads 1561. Control circuit 1564 connects via tap connections 1590, 1592, 1594 to powered cable pairs 1532, 1544, 1548 of communication cables 1508, 1510 to receive power from cable pairs 1532, 1544, 1548. Depending on the operation of the this embodiment of the invention, control circuit 1564 optionally connects or couples 1590, 1592, and 1594 to either combined PD port unit 1562 via the PoE transfer leads 1561 or to another powered cable pair 1596 of a communication cable 1598 that is connected to the pass through communication port 1578 via tap connection 1586. In that way, the control circuit 1564 can deliver power to either or both optional loads 1568, 1572 or pass power through to optional load 1588. Detection unit 1576 monitors the presence of first and second optional loads 1568, 1572 via respective monitoring leads 1569, 1573, monitors the presence of third optional load 1588 via tap connection 1586, and provides detection information based on such monitoring to the control circuit 1564 via control lead 1565.

Second powered device 1512, in this particular embodiment, which may be a peripheral or plug-in device, includes a PoE enabled port 1513, a non-combined PD port unit 1599 and a third optional load 1588. The device 1512 and third optional load 1588 illustrated in FIG. 15 and the other various devices and optional loads as discussed both with this and other embodiments might be, for example, WiFi access points, WiMax access points, maintenance terminals, IP camera, and/or combinations thereof as discussed above. Non-combined PD port unit 1599 connects via tap connection 1587 to the powered cable pair 1596 of a communication cable 1598 that is connected to the PoE enabled port 1513. Non-combined PSE port unit 182 delivers PoE power to second optional load 1588 via suitable internal leads.

In contrast to the embodiment of the powered device 1402 in FIG. 14, powered device 1502 in FIG. 15 utilizes combined PD port unit 1562, which is configured to support PoE negotiation with non-combined PSE port unit 1514 over powered cable pair 1528. Upon sensing a predetermined resistance, in some embodiments, non-combined PSE Port unit 1514 provides combined PD port unit 1562 with a predetermined initial power level that is used by combined PD port unit 1562 to power-up enough circuitry to conduct subsequent PoE power negotiations with non-combined PSE Port unit 1514. Upon receipt of the higher, negotiated power level, combined power unit 1562 delivers power to and initiates a startup of base load 1566 circuitry, detection unit 1576 and control circuit 1564.

Upon startup, detection unit 1576 tests leads 1569 and 1572 and tap connection 1586 to determine whether either first or second optional loads 1568, 1572 and third optional load 1588, respectively, are present. If so, detection unit 1576 is operable to report to control circuit 1564 that the respective detected load is present. Upon startup, control circuit 1564 awaits detection information from detection unit 1576. If the first optional load 1568 is detected, control circuit 1564 may connect any of taps 1590, 1592, 1594 from powered cable pairs 1532, 1544, and 1548 of cables 1508 and 1510 to combined PD port unit 1562 via PoE transfer leads 1561. If first optional load 1568 is not detected, but second optional load 1572 is detected, control circuit 1564 may also connect any of taps 1590, 1592, 1594 from powered cable pairs 1532, 1544, and 1548 of cables 1508 and 1510 to combined PD port unit 1562 via PoE transfer leads 1561. If neither the first or second optional loads 1568, 1572 are detected, and/or if the third optional load 1588 is detected, control circuit 1564 connects any of taps 1590, 1592, 1594 from powered cable pairs 1532, 1544, and 1548 of cables 1508 and 1510 to power taps 1586 on or associated with powered pair 1596 within cable 1598. Wire pairs 1597 are not used in this illustrated embodiment.

Connecting any of taps 1590, 1592, 1594 from powered cable pairs 1532, 1544, and 1548 of cables 1508 and 1510 to the combined PD port unit 1562 allows combined PD port unit 1562 to perform PD/PSE PoE power negotiation with the non-combined PSE port units 1516, 1520, or 1522. Once a negotiated power level is received, combined PD port unit 152 provides power to first and/or second optional loads 1568, 1572. To power third optional load 1588, connecting any of taps 1590, 1592, 1594 from powered cable pairs 1532, 1544, and 1548 of cables 1508 and 1510 to power taps 1586 on or associated with powered cable pair 1596 within cable 1598 allows non-combined PD port unit 1599 to perform PD/PSE PoE power negotiation with non-combined PSE port units 1516, 1520, or 1522. Once a negotiated power level is received, non-combined PD port unit 1599 provides power to second third optional load 1588.

Figure 16A:
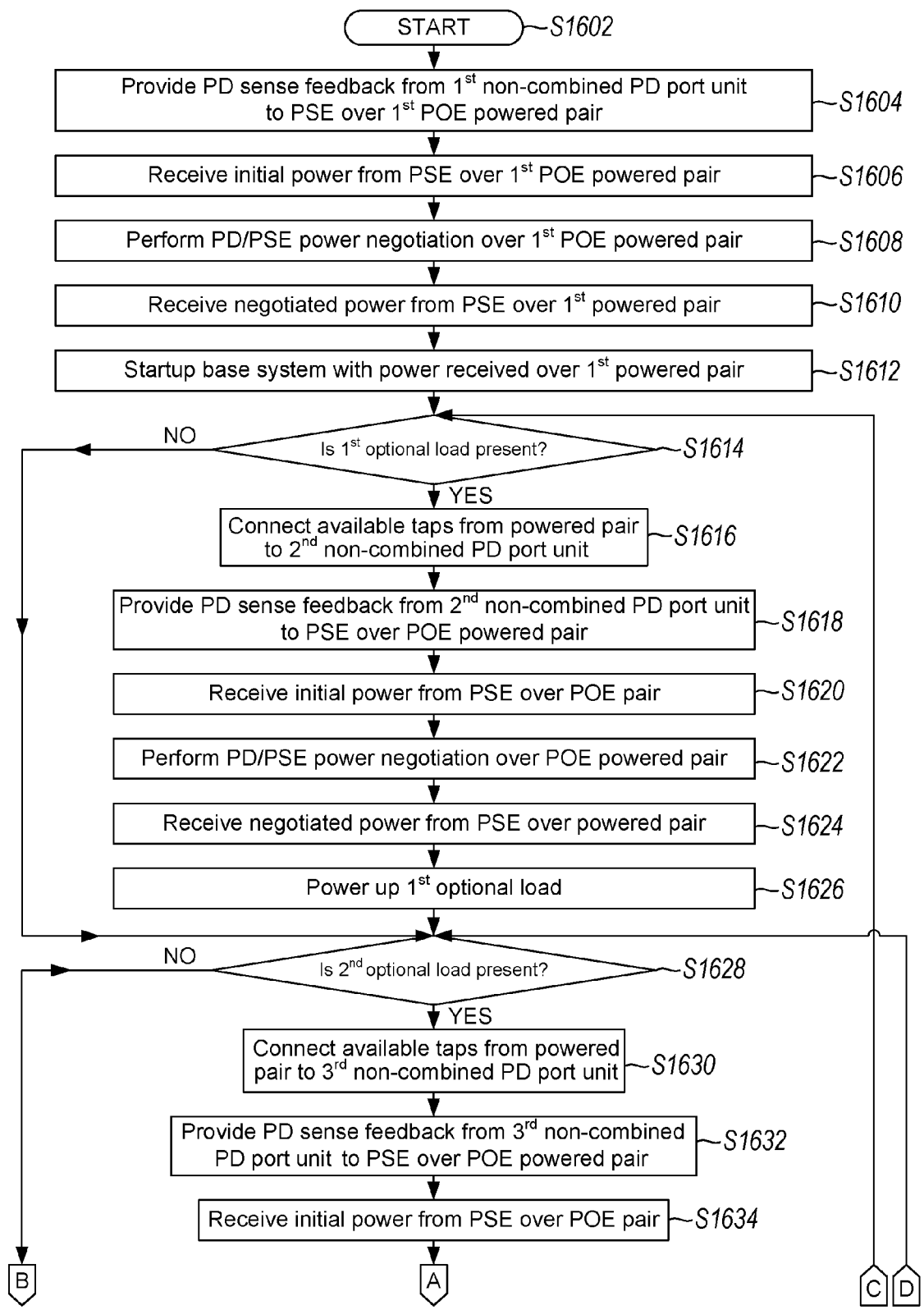
FIGS. 16A-B are flow-charts of an example process performed by the embodiment of the powered device described above with respect to FIG. 14.
Figure 16B:
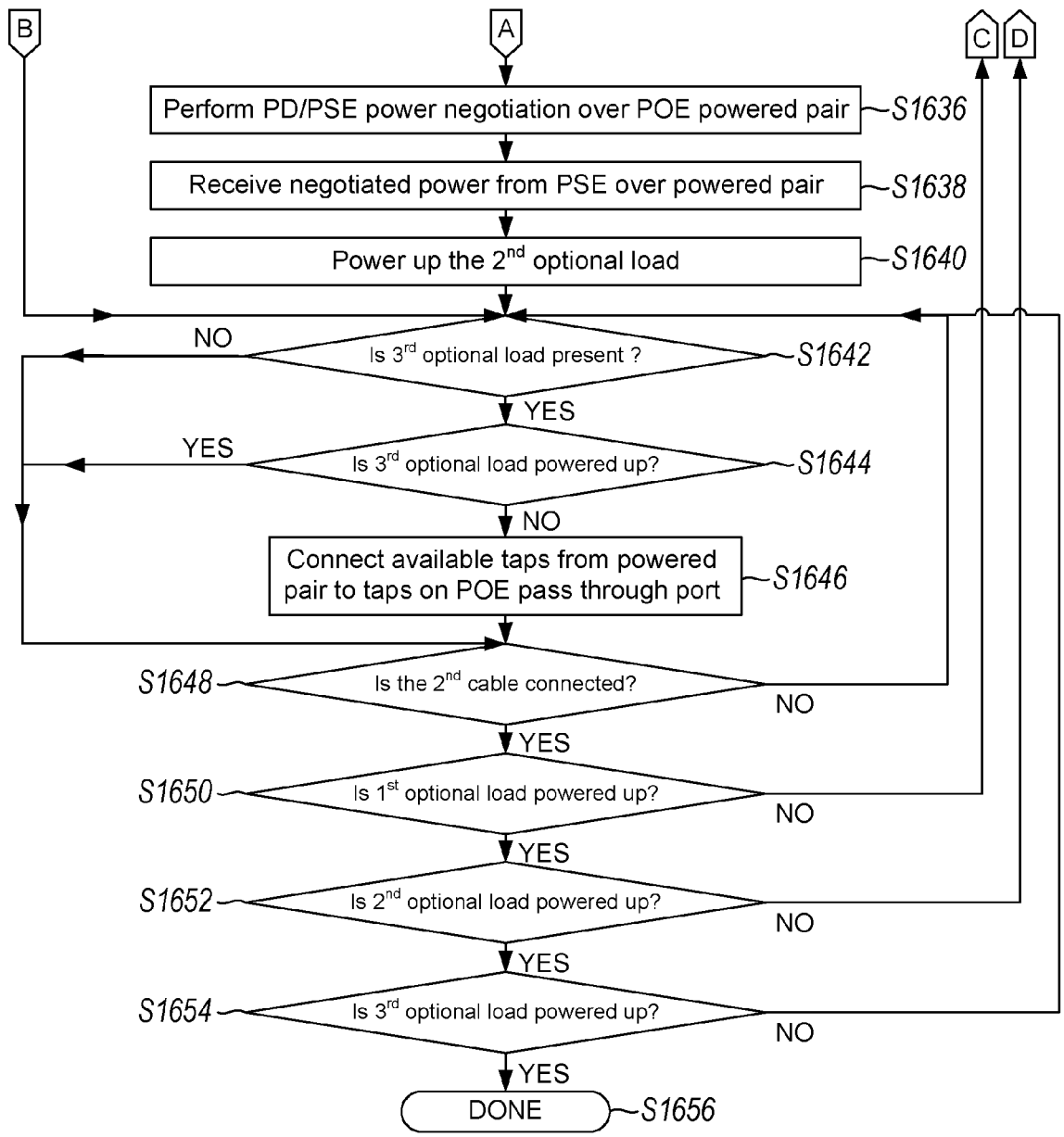

FIGS. 16A-B are flow-charts of an example process performed by a powered device configured with multiple non-combined PD port units, e.g., non-combined PD port units 1462, 1470, 1474 described above with respect to FIG. 14 and a powered PoE pass-through port 1478, as described above with respect to FIG. 14. As shown in FIGS. 16A-B, operation of the process begins at S1602 and proceeds to S1604.

At S1604, the first non-combined PD port unit 1462 provides PD sense feedback to PSE 1414 over first PoE powered pair 1428, and operation of the process continues at S1606

At S1606, initial power is received from PSE 1414 over first PoE powered pair 1428, and operation of the process continues at S1608.

At S1608, PD/PSE power negotiation is performed over the first powered pair 1428, and operation of the process continues at S1610.

At S1610, negotiated power is received from PSE 1414 over first powered pair 1428, and operation of the process continues at S1612.

At S1612, the base system (base load 1466, detection unit 1476, control circuit 1464) is started with the power received over the first powered pair 1428, and operation of the process continues at S1614.

At S1614, if the first optional load is not present, operation of the process continues at S1628. However, if the first optional load is present, operation of the process continues at S1616.

At S1616, available taps 1490 (1490, 1492, and/or 1494 if second cable is connected) are connected to the second non-combined PD port unit 1470, and operation of the process continues at S1618.

At S1618, PD sense feedback is provided from the second non-combined PD port unit 1470 to PSE 1416 (any of 1416, 1420, 1422 if second cable connected) over PoE powered pair 1432 (any of 1432, 1444, 1448 if second cable connected), and operation of the process continues at S1620.

At S1620, initial power is received from PSE 1416 (any of 1416, 1420, 1422 if second cable connected) over PoE powered pair 1432 (any of 1432, 1444, 1448 if second cable connected), and operation of the process continues at S1622.

At S1622, PD/PSE power negotiation is performed over PoE powered pair 1432 (any of 1432, 1444, 1448 if second cable connected), and operation of the process continues at S1624.

At S1624, negotiated power is received from PSE 1416 (any of 1416, 1420, 1422 if second cable connected) over powered pair 1432 (any of 1432, 1444, 1448 if second cable connected), and operation of the process continues at S1626.

At S1626, the first optional load 1468 is powered up, and operation of the process continues at S1628.

At S1628, if the second optional load 1472 is not present, operation of the process continues at S1642. However, if the second optional load 1472 is present, operation of the process continues at S1630.

At S1630, available taps 1490, 1492, and/or 1494 are connected to the third non-combined PD port unit 1474, and operation of the process continues at S1632.

At S1632, PD sense feedback is provided from the third non-combined PD port unit 1474 to PSE 1416 (any of 1416, 1420, 1422 if second cable connected) over PoE powered pair 1432 (any of 1432, 1444, 1448 if second cable connected), and operation of the process continues at S1634.

At S1634, initial power is received from PSE 1416 (any of 1416, 1420, 1422 if second cable connected) over PoE powered pair 1432 (any of 1432, 1444, 1448 if second cable connected), and operation of the process continues at S1636.

At S1636, PD/PSE power negotiation is performed over PoE powered pair 1432 (any of 1432, 1444, 1448 if second cable connected), and operation of the process continues at S1638.

At S1638, negotiated power is received from PSE 1416 (any of 1416, 1420, 1422 if second cable connected) over powered pair 1432 (any of 1432, 1444, 1448 if second cable connected), and operation of the process continues at S1640.

At S1640, the second optional load 1472 is powered up, and operation of the process continues at S1642.

At S1642, if the third optional load 1488 is not present, operation of the process continues at S1648. However, if the third optional load 1488 is present, operation of the process continues at S1644.

At S1644, if the third optional load 1488 is powered up, then the process continues at S1648. Otherwise, if the third optional load 1488 is not powered up, operation of the process continues at S1646.

At S1646, available taps 1490 (1490, 1492, and/or 1494 if second cable is connected) are connected to the PoE pass through port 1478, and operation of the process continues at S1648.

At S1648, if the second cable 1410 is not connected, operation of the process continues at S1642. However, if the second cable 1410 is connected, operation of the process continues at S1650.

At S1650, if the first optional load 1468 is not powered up, then operation of the process continues at S1614. Otherwise, if the first optional load 1468 is powered up, the process continues at S1652.

At S1652, if the second optional load 1472 is not powered up, then operation of the process continues at S1628. Otherwise, if the second optional load 1472 is powered up, the process continues at S1654.

At S1654, if the third optional load 1488 is not powered up, then operation of the process continues at S1642. Otherwise, if third first optional load 1488 is powered up, the process continues at S1656.

Operation of the process concludes at S1656.

Figure 17A:
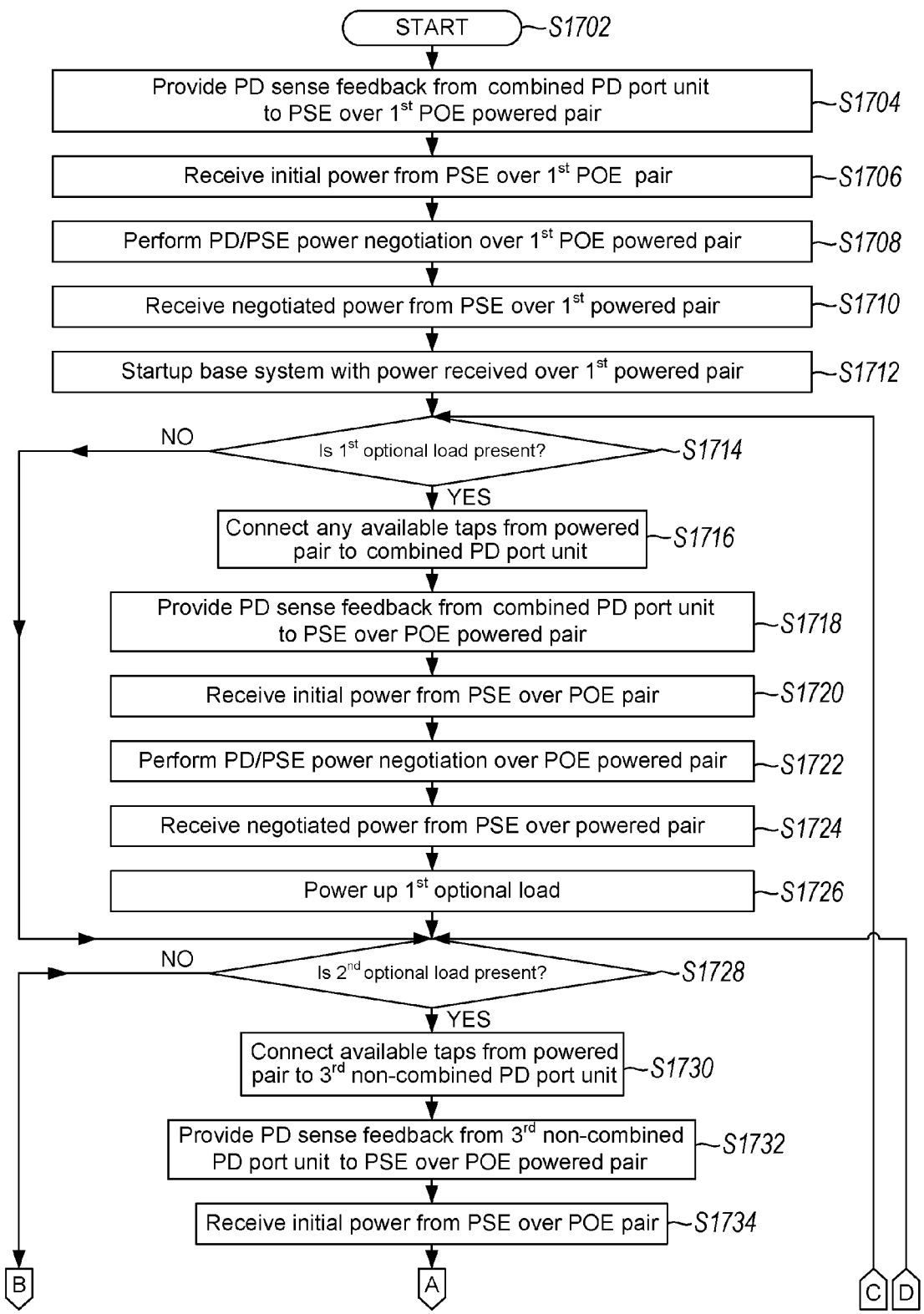
FIGS. 17A-B are flow-charts of an example process performed by the embodiment of the powered device described above with respect to FIG. 15.
Figure 17B:
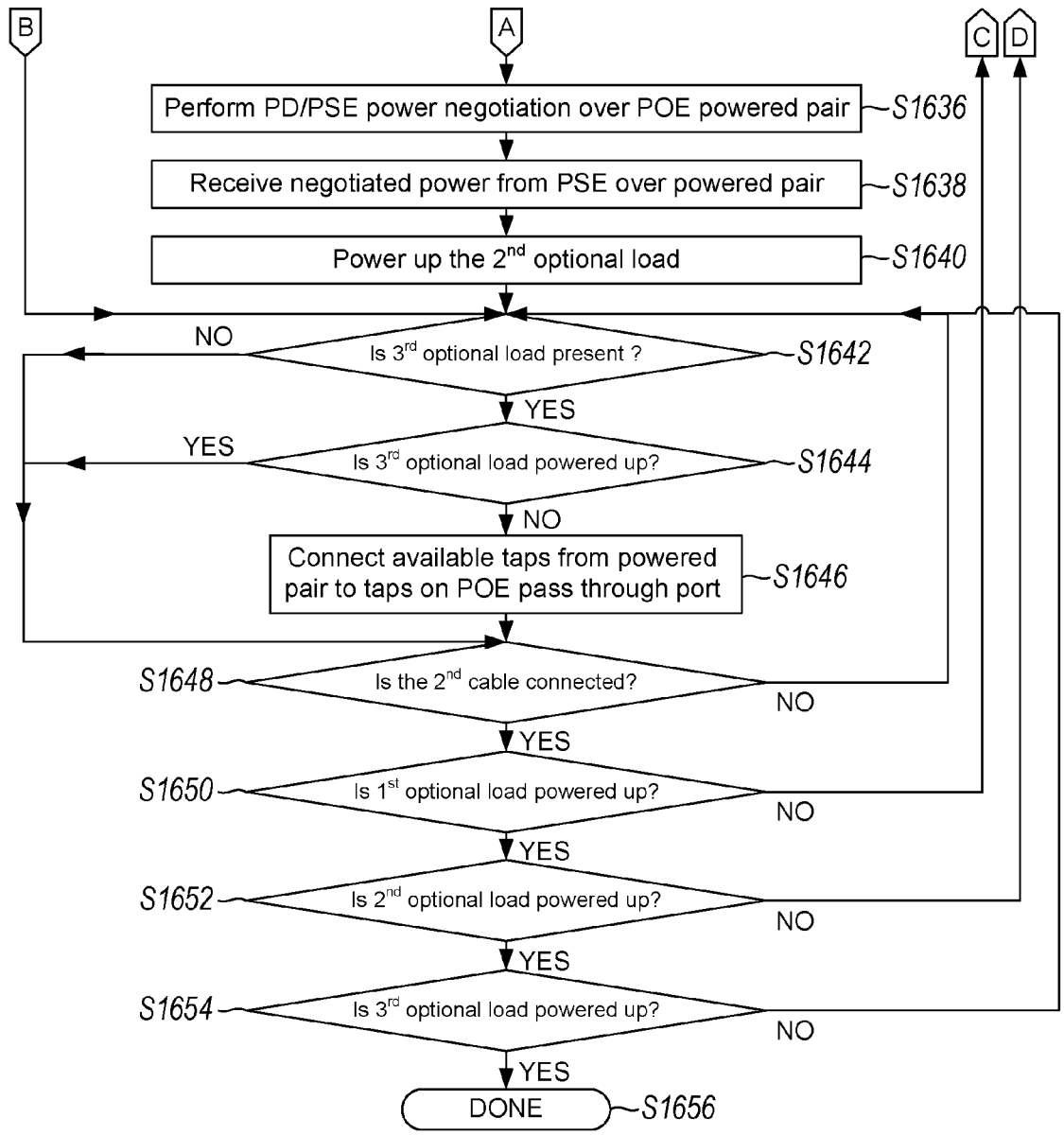

FIGS. 17A-B are flow-charts of an example process performed by a powered device configured with a single combined PD port unit, e.g., combined PD port unit 1562 described above with respect to FIG. 15 and a powered PoE pass-through port 1578, as described above with respect to FIG. 15. As shown in FIGS. 17A-B, operation of the process begins at S1702 and proceeds to S1704.

At S1704, the combined PD port unit 1562 provides PD sense feedback to PSE 1514 over first PoE powered pair 1528, and operation of the process continues at S1706

At S1706, initial power is received from PSE 1514 over first PoE powered pair 1528, and operation of the process continues at S1708.

At S1708, PD/PSE power negotiation is performed over the first powered pair 1528, and operation of the process continues at S1710.

At S1710, negotiated power is received from PSE 1514 over first powered pair 1528, and operation of the process continues at S1712.

At S1712, the base system (base load 1566, detection unit 1576, control circuit 1564) is started with the power received over the first powered pair 1528, and operation of the process continues at S1714.

At S1714, if the first optional load is not present, operation of the process continues at S1728. However, if the first optional load is present, operation of the process continues at S1716.

At S1716, available taps 1590 (1590, 1592, and/or 1594 is second cable is connected) are connected to the combined PD port unit 1562, and operation of the process continues at S1718.

At S1718, PD sense feedback is provided from the combined PD port unit 1562 to PSE 1516 (any of 1516, 1520, 1522 if second cable connected) over PoE powered pair 1532 (any of 1532, 1544, 1548 if second cable connected), and operation of the process continues at S1720.

At S1720, initial power is received from PSE 1516 (any of 1516, 1520, 1522 if second cable connected) over PoE powered pair 1532 (any of 1532, 1544, 1548 if second cable connected), and operation of the process continues at S1722.

At S1722, PD/PSE power negotiation is performed over PoE powered pair 1532 (any of 1532, 1544, 1548 if second cable connected), and operation of the process continues at S1724.

At S1724, negotiated power is received from PSE 1516 (any of 1516, 1520, 1522 if second cable connected) over powered pair 1532 (any of 1532, 1544, 1548 if second cable connected), and operation of the process continues at S1726.

At S1726, the first optional load 1568 is powered up, and operation of the process continues at S1728.

At S1728, if the second optional load 1572 is not present, operation of the process continues at S1742. However, if the second optional load 1572 is present, operation of the process continues at S1730.

At S1730, available taps 1590 (1590, 1592, and/or 1594 if second cable is connected) are connected to the combined PD port unit 1562, and operation of the process continues at S1732.

At S1732, PD sense feedback is provided from the combined PD port unit 1562 to PSE 1516 (any of 1516, 1520, 1522 if second cable connected) over PoE powered pair 1532 (any of 1532, 1544, 1548 if second cable connected), and operation of the process continues at S1734.

At S1734, initial power is received from PSE 1516 (any of 1516, 1520, 1522 if second cable connected) over PoE powered pair 1532 (any of 1532, 1544, 1548 if second cable connected), and operation of the process continues at S1736.

At S1736, PD/PSE power negotiation is performed over PoE powered pair 1532 (any of 1532, 1544, 1548 if second cable connected), and operation of the process continues at S1738.

At S1738, negotiated power is received from PSE 1516 (any of 1516, 1520, 1522 if second cable connected) over powered pair 1532 (any of 1532, 1544, 1548 if second cable connected), and operation of the process continues at S1740.

At S1740, the second optional load 1572 is powered up, and operation of the process continues at S1742.

At S1742, if the third optional load 1588 is not present, operation of the process continues at S1748. However, if the third optional load 1588 is present, operation of the process continues at S1744.

At S1744, if the third optional load 1588 is powered up, then the process continues at S1748. Otherwise, if the third optional load 1588 is not powered up, operation of the process continues at S1746.

At S1746, available taps 1590 (1590, 1592, and/or 1594 if second cable is connected) are connected to the PoE pass through port 1578, and operation of the process continues at S1748.

At S1748, if the second cable 1510 is not connected, operation of the process continues at S1742. However, if the second cable 1510 is connected, operation of the process continues at S1750.

At S1750, if the first optional load 1568 is not powered up, then operation of the process continues at S1714. Otherwise, if the first optional load 1568 is powered up, the process continues at S1752.

At S1752, if the second optional load 1572 is not powered up, then operation of the process continues at S1728. Otherwise, if the second optional load 1572 is powered up, the process continues at S1754.

At S1754, if the third optional load 1588 is not powered up, then operation of the process continues at S1742. Otherwise, if third first optional load 1588 is powered up, the process continues at S1756.

Operation of the process concludes at S1756.

In the embodiments illustrated above, the external loads powered through the PoE pass through ports are not preferred loads, though in some embodiments, the external loads may get a preference over the internal optional loads. For example, and referring again to FIG. 14, the overall system has two cables 1408, 1410 attached to the powered device 1402 which drive the base load 1466 plus all three optional loads 1468, 1472, 1488. But, if one of the cables, such as cable 1410, is removed and the system restarted, this would leave only two of the four non-combined PSE port units 1414, 1416 to power all of the loads. This situation creates a scenario where all three optional loads 1468, 1472 including the external load 1488 exist but power is only available to support one of the three optional loads 1468, 1472, 1488.

In order to determine which of the three optional loads 1468, 1472, 1488 receives power in the limited power scenario, a preference is assigned to each of the load 1468, 1472, 1488 to determine which load has priority over the others, and ultimately which loads 1468, 1472, 1488 receive power when not all power is available, or when there are more loads than available power. For example if two PoE power pairs are available and loads within the powered device are preferred, then the two loads within the device are powered first and no power is supplied to the external load. However, if the external load is preferred, then only one load in the powered device is provided with power and the external load is powered.

Similarly, for a configuration having four PoE powered pairs, if the loads within the powered device are preferred, then up to four loads may be powered and the external device will only receive power if one of those four internal loads is not active. Conversely, if the external load is preferred, then only three of the four internal loads may receive power while the external load receives power.

It is noted that the described powered device (PD) that detects the presence of power loads within the PD and that distributes PoE power based on a set of determined priorities and the detected loads is configurable to support any number of PSE-to-PD cable connections and to distribute PoE power received over powered pairs of the respective PSE-to-PD cable connections to any number of fixed and/or optional loads within the powered device, and/or optional loads connected to the powered device via a pass through communication port.

It is noted that the described powered device (PD) is configurable to operate with any communication cable with 8 or more conductors, including, but not limited to Category 5 and Category 6 twisted pair cabling. However, other communication cable can also be used. For example, use of a communication cable with four additional conductors would allow a third PoE powered pair to be supported by the communication cable between to PSE and the described powered device.

For purposes of explanation, in the above description, numerous specific details are set forth in order to provide a thorough understanding of the described powered device (PD) that detects the presence of optional power loads within the PD and that distributes PoE power based on a set of determined priorities and the detected loads. It will be apparent, however, to one skilled in the art that the described a powered device (PD) may be practiced without these specific details.

While the described powered device (PD) detects the presence of optional power loads within the PD and distributes PoE power based on a set of determined priorities and the detected loads has been described in conjunction with the specific embodiments thereof, it is evident that many alternatives, modifications, and variations will be apparent to those skilled in the art. Accordingly, embodiments of the described powered device, as set forth herein are intended to be illustrative, not limiting. There are changes that may be made without departing from the scope of the invention.

What is claimed is:

1. A powered telecommunications device, comprising:
    a combined powered device port unit configured to negotiate receipt of a level of power from power sourcing equipment, the power received on a first pair of taps, the port unit further configured for combining power received on multiple pairs of taps;
    a detection unit configured to detect a presence of a first optional load and to detect a presence of a second optional load;
    a control circuit configured to establish connectivity between a second pair of taps and the first optional load in response to the detection unit detecting the first optional load; and
    the control circuit further configured to establish connectivity between the second pair of taps and a third pair of taps in response to the detection unit failing to detect the first optional load and detecting the second optional load.

2. The device of claim 1, wherein the power from the power sourcing equipment is Power over Ethernet power.

3. The device of claim 1, wherein at least one of the first, second and third pair of taps are Power over Ethernet taps.

4. The device of claim 3 wherein the Power over Ethernet taps are associated with a powered device port.

5. The device of claim 1 wherein establishing connectivity between a second pair of taps and the first optional load includes establishing connectivity with the combined powered device port unit.

6. The device of claim 1 wherein the third pair of taps are associated with a pass-through communication port.

7. The device of claim 1, wherein the combined powered device port unit comprises:
    a first powered device powered pair unit configured to negotiate a first level of power with power sourcing equipment;
    a second powered device powered pair unit configured to negotiate a second level of power with power sourcing equipment;
    a first intermediate power module configured to convert the negotiated first level of power to an intermediate voltage level;
    a second intermediate power module configured to convert the negotiated second level of power to the intermediate voltage level;
    a power combining module configured to combine power at the intermediate voltage level received from the first intermediate power module and received from the second intermediate power module; and
    a power conversion and distribution module configured to convert power at the intermediate voltage level received from the power combining module to a source voltage level prior to distributing to a load.

8. The device of claim 1, wherein the combined powered device port unit comprises:
    a first powered device powered pair unit configured to negotiate a first level of power with power sourcing equipment,
    a second powered device powered pair unit configured to negotiate a second level of power with the power sourcing equipment;
    a power combining module configured to combine power received from the first powered device powered pair unit and received from the second powered device powered pair unit;
    an intermediate power module configured to convert combined power received from the power combining module to an intermediate voltage level; and
    a power conversion and distribution module configured to convert power at the intermediate voltage level received from the intermediate power module to a source voltage level prior to distributing to a load.

9. The device of claim 1, wherein the powered device is configured as a distributed antenna system remote antenna unit.

10. The device of claim 1, wherein the first optional load is a remote antenna unit RF signal processing board.

11. The device of claim 1, wherein the second optional load is selected from a group consisting of: a standard access point, a WiFi access point, a WiMax access point, a maintenance terminal, IP camera, and combinations thereof.

12. A method of distributing power in a powered telecommunications device, the method comprising:
    establishing connectivity between a first pair of taps and a power combining circuit;
    performing a detection process to detect a presence of a first optional load;
    performing a detection process to detect a presence of a second optional load;
    in response to detecting the first optional load, establishing connectivity between a second pair of taps and the first optional load; and in response to failing to detect the first optional load and detecting the second optional load, establishing connectivity between the second pair of taps and a third pair of taps.

13. The method of claim 12, wherein the first, second, and third pair of taps are Power over Ethernet taps.

14. The method of claim 12 wherein establishing connectivity between a second pair of taps and the first optional load includes establishing connectivity with the power combining circuit.

15. The method of claim 12, further comprising:
negotiating a first level of power with power sourcing equipment;
negotiating a second level of power with the power sourcing equipment;
converting the negotiated first level of power to an intermediate voltage level;
converting the negotiated second level of power to an intermediate voltage level;
combining the converted power at the intermediate voltage level;
converting the combined power at the intermediate voltage levels to one of several voltage levels; and
distributing the combined converted power at one of the several voltage levels to a load.

16. The method of claim 15, wherein the power from the power sourcing equipment is Power over Ethernet power.

17. The method of claim 15, wherein distributing the combined converted power comprises:
distributing the combined converted power at a selected voltage to at least one of a base load, the first optional load, and the second optional load.

18. The method of claim 12, wherein the device is a remote antenna unit in a distributed antenna system.

19. The method of claim 12, further comprising:
configuring the device to communicate with and to provide power to an RF signal processing board as the first optional circuit load.

20. The method of claim 12, further comprising:
configuring the remote antenna unit to communicate with and to supply power to a second optional load selected from a group consisting of: a standard access point, a WiFi access point, a WiMax access point, a maintenance terminal, IP camera, and combinations thereof.

21. A powered telecommunications system, comprising:
a first powered device including:
a first powered device port unit configured to negotiate receipt of power from power sourcing equipment on a first pair of taps;
a base power load coupled with the first powered device port unit and configured to receive power therefrom;
a second pair of taps coupled for receipt of power from the power sourcing equipment, the second pair of taps connected with a pass-through port of the first powered device;
a second powered device including:
a second powered device port unit configured to negotiate receipt of power from power sourcing equipment;
an optional power load coupled with the second powered device port unit and configured to receive power therefrom;
a powered cable pair coupled with the second powered device port unit and with the pass through-port for connecting the second pair of taps with the second powered device port unit to deliver power to the optional power load.

22. The system of claim 21, the first powered device further comprising a control circuit positioned between the second pair of taps and the pass-through port, the control circuit configured to selectively establish connectivity between the second pair of taps and the pass-through port.

23. The system of claim 21 wherein the second pair of taps and pass-through port are permanently connected.

24. The system of claim 21 wherein the power sourcing equipment includes a plurality of non-combined power sourcing equipment (PSE) port units, the first powered device port unit coupled with at least one PSE port unit and the pass-through port of the first powered device coupled with a different PSE port unit so the base load and optional load receive power through different PSE port units.

25. The system of claim 21 wherein the first powered device includes a remote antenna unit of a distributed antenna system.

26. The system of claim 21 wherein the second powered device is selected from a group including a standard access point, a WIFI access point, a WiMax access point, a maintenance terminal, an IP camera and combinations thereof.

* * * * *